(12) United States Patent
Fujiwara et al.

(10) Patent No.: US 11,884,903 B2
(45) Date of Patent: Jan. 30, 2024

(54) ALCOHOLIC BEVERAGE CONTAINING STEVIOL GLYCOSIDES

(71) Applicant: SUNTORY HOLDINGS LIMITED, Osaka (JP)

(72) Inventors: Yasuko Fujiwara, Kanagawa (JP); Mika Kono, Kanagawa (JP); Yuriko Watanabe, Kanagawa (JP)

(73) Assignee: SUNTORY HOLDINGS LIMITED, Osaka (JP)

( * ) Notice: Subject to any disclaimer, the term of this patent is extended or adjusted under 35 U.S.C. 154(b) by 0 days.

(21) Appl. No.: 17/771,235

(22) PCT Filed: Apr. 19, 2021

(86) PCT No.: PCT/JP2021/015858
§ 371 (c)(1),
(2) Date: Apr. 22, 2022

(87) PCT Pub. No.: WO2021/215394
PCT Pub. Date: Oct. 28, 2021

(65) Prior Publication Data
US 2022/0356422 A1    Nov. 10, 2022

(30) Foreign Application Priority Data

Apr. 20, 2020 (JP) ................. 2020-074933
Nov. 12, 2020 (JP) ................. 2020-188786

(51) Int. Cl.
*C12G 3/06* (2006.01)
*A23L 27/30* (2016.01)

(52) U.S. Cl.
CPC .............. *C12G 3/06* (2013.01); *A23L 27/36* (2016.08); *A23V 2002/00* (2013.01)

(58) Field of Classification Search
CPC .................. C12G 3/06; A23L 27/36
See application file for complete search history.

(56) References Cited

U.S. PATENT DOCUMENTS

| | | | | |
|---|---|---|---|---|
| 2010/0119667 | A1* | 5/2010 | Livaich | C12G 3/06 426/131 |
| 2014/0099403 | A1 | 4/2014 | Prakash et al. | |
| 2014/0343262 | A1 | 11/2014 | Prakash et al. | |
| 2015/0017284 | A1* | 1/2015 | Prakash | A23L 27/36 426/654 |
| 2015/0216218 | A1 | 8/2015 | Prakash et al. | |
| 2016/0031924 | A9 | 2/2016 | Prakash et al. | |
| 2019/0218488 | A1* | 7/2019 | Choi | C12G 3/06 |
| 2021/0147463 | A1 | 5/2021 | Prakash et al. | |

FOREIGN PATENT DOCUMENTS

| | | |
|---|---|---|
| AU | 2017395511 A1 | 8/2019 |
| CN | 101662958 A | 3/2010 |
| CN | 108289487 A | 7/2018 |
| CN | 110167356 A | 8/2019 |
| EP | 3574767 A1 | 12/2019 |
| JP | 2015-502404 A | 1/2015 |
| JP | 2016-158585 A | 9/2016 |
| JP | 2016-158586 A | 9/2016 |
| JP | 2017-216892 A | 12/2017 |
| JP | 2019-187302 A | 10/2019 |
| JP | 2019-198801 A | 11/2019 |
| WO | 2008/112852 A1 | 9/2008 |
| WO | WO 2017/035527 A1 | 3/2017 |
| WO | 2017/059414 A1 | 4/2017 |

OTHER PUBLICATIONS

ISR for PCT/JP2021/015858, dated Jun. 15, 2021.
Decision to Grant a Patent for JP App. No. 2021-564264, dated Dec. 15, 2021 (w/ translation).
Espinoza et al., "Identification, Quantification, and Sensory Characterization of Steviol Glycosides from Differently Processed *Stevia rebaudiana* Commercial Extracts", J. Agric. Food Chem., 62:11797-11804 (2014).
Gardana et al., "Determination of steviol glycosides in commercial extracts of *Stevia rebaudiana* and sweeteners by utlra-high performance liquid chromatography Orbitrap mass spectrometry.", Journal of Chromatography A, 1578:8-14 (2018).
Kubica et al., "Determination of eight artificial sweeteners and common *Stevia rebaudiana* glycosides in non-alcoholic and alcoholic beverages by reversed-phase liquid chromatography coupled with tandem mass spectrometry", Anal. Bioanal. Chem., 407:1505-1512 (2015).
Prakash et al., "Development of Next Generation Stevia Sweetner: Rebaudioside M", Foods, 3:162-175 (2014).
"PureCircle Names New Top Additions To Its Commerical Team to Help Further Fuel Its Growth.", PureCircle, https://pureeircle.com/news.purecircle-names-new-top-additions-to-its-commerical-team-to-help-further-fuel-its-growth/, Jun. 4, 2021.
Chinese Office Action that dated Jun. 2, 2023 in Chinese Patent Application No. 202180029242.1 along with English language translation thereof.

* cited by examiner

*Primary Examiner* — Jeffrey P Mornhinweg
(74) *Attorney, Agent, or Firm* — GREENBLUM & BERNTSTEIN, P.L.C.

(57) ABSTRACT

The present invention pertains to an alcoholic beverage that contains one or more types of steviol glycosides selected from rebaudioside D and rebaudioside M, and has a steviol glycoside content of 0.001-0.5 g/1,000 ml and an alcohol content of 0.5-40.0 v/v %.

18 Claims, 2 Drawing Sheets

ALCOHOLIC BEVERAGE CONTAINING STEVIOL GLYCOSIDES

TECHNICAL FIELD

The present invention relates to an alcoholic beverage containing one or more steviol glycosides selected from rebaudioside D and rebaudioside M. and a method for producing the alcoholic beverage. The present invention also relates to a concentrated product (e.g. concentrated liquid) for preparing the alcoholic beverage, and a method for reducing alcohol's distinctive pungency of an alcoholic beverage.

BACKGROUND ART

Recently, in various parts of the world, especially in Japan, alcoholic beverages having various tastes (flavors) and a wide range of alcohol percentages have been sold as packaged alcoholic beverages with diversification of consumer preference. Examples of such alcoholic beverages include Japanese distilled spirit-based beverages, cocktails and highballs obtained by adding fruit juice, a flavoring agent or the like to a liquor such as Japanese distilled spirit, vodka or whisky. Further, in recent years, products in which the calorie content is reduced or flavor is improved with respect to such a liquor have been favored and vigorously developed.

Patent Literature 1 discloses that by adding a predetermined amount of *Stevia* to an alcoholic beverage containing at least one acidulant selected from lactic acid and malic acid and having a content of the acidulant of 0.005 to 2.000 g/100 mL in terms of citric acid, an alcoholic beverage is provided in which lingering sweetness and bitterness are suppressed.

Patent Literature 2 discloses that by adding a predetermined amount of *Stevia* to an alcoholic beverage having lemon juice content of 0.3 to 4.0% in terms of fruit juice ratio, odd taste of lemon juice which cannot be felt when the content of lemon juice is high, and unpleasant flavor derived from alcohol are suppressed.

CITATION LIST

Patent Literature

Patent Literature 1: Japanese Patent Laid-Open No. 2016-158585
Patent Literature 2: Japanese Patent Laid-Open No. 2016-158586

SUMMARY OF INVENTION

Problem to be Solved by the Invention

Under the above-described circumstances, there is a need for development of a novel alcoholic beverage having good quality of taste.

Means for Solving the Problems

The present inventors have succeeded in reducing alcohol's distinctive pungency of an alcoholic beverage for the first time by adding a predetermined amount of one or more steviol glycosides selected from rebaudioside D and rebaudioside M to a beverage containing a predetermined amount of alcohol. The present invention is based on this finding.

The present invention provides the following alcoholic beverage containing rebaudioside D and/or rebaudioside M, method for producing the alcoholic beverage, concentrated product (concentrated liquid) for preparing the alcoholic beverage and method for reducing alcohol's distinctive pungency of an alcoholic beverage, among others.

[1]
An alcoholic beverage comprising one or more steviol glycosides selected from rebaudioside D and rebaudioside M,
wherein a content of the steviol glycosides is 0.001 to 0.5 g/1000 ml, and an alcohol content is 0.5 to 40.0 v/v %.

[2]
The alcoholic beverage according to [1], wherein a sweetness intensity is 0.1 to 20.

[3]
The alcoholic beverage according to [1] or [2], further comprising an acidic flavor substance,
wherein an acidity is 0.01 to 5.0 w/v %.

[4]
The alcoholic beverage according to any one of [1] to [3], wherein a sweetness intensity/acidity is 1 to 700.

[5]
The alcoholic beverage according to any one of [1] to [4], further comprising sodium at 5 to 200 mg/100 ml, and/or potassium at 5 to 300 mg/100 ml.

[6]
The alcoholic beverage according to any one of [1] to [5], further comprising a low-intensity sweetener.

[7]
The alcoholic beverage according to [6], wherein the low-intensity sweetener comprises a sweetener selected from glucose, sucrose, fructose, maltose, oligosaccharide, lactose, psicose, allose, tagatose, xylose, ribose, high-fructose corn syrup and a combination thereof.

[8]
The alcoholic beverage according to any one of [1] to [7], wherein the alcoholic beverage has an energy of not more than 100 Kcal/100 ml.

[9]
The alcoholic beverage according to any one of [5] to [8], wherein the sodium is in at least one form selected from the group consisting of sodium chloride, sodium hydroxide, sodium malate, sodium sulfate, sodium citrate, sodium phosphate, sodium carbonate, sodium disulfide, sodium bicarbonate, sodium alginate, sodium arginate, sodium glucoheptanoate, sodium gluconate, sodium glutamate, sodium tartrate, sodium aspartate, sodium lactate, casein sodium, sodium ascorbate and a mixture thereof.

[10]
The alcoholic beverage according to any one of [5] to [8], wherein the potassium is in at least one form selected from the group consisting of potassium alginate, potassium chloride, potassium citrate, potassium gluconate, potassium L-glutamate, potassium bromate, potassium hydrogen DL-tartrate, potassium hydrogen L-tartrate, potassium nitrate, potassium hydroxide, potassium sorbate, potassium carbonate, potassium lactate, norbixin potassium, potassium pyrosulfite, tetrapotassium pyrophosphate, potassium ferrocyanide, potassium polyphosphate, potassium metaphosphate, aluminum potassium sulfate, potassium sulfate, tripotassium phosphate, dipotassium hydrogen phosphate, potassium dihydrogen phosphate and a mixture thereof.

[11]
The alcoholic beverage according to any one of [1] to [10], which is a beverage flavored with a citrus, a pomaceous fruit, a stone fruit, a berry fruit, a nut, a tropical or semitropical fruit, a fruity vegetable, a root vegetable, a leaf or stem vegetable, a fruit vegetable, a savory herb and garnish, an energy drink, coffee, a tea, cocoa, cola, a dessert or a milky beverage.

[12]

The alcoholic beverage according to any one of [1] to [11], wherein the alcoholic beverage is a sparkling beverage.

[12-1]

The alcoholic beverage according to any one of [1] to [12], further comprising a high-intensity sweetener other than rebaudioside D and rebaudioside M.

[13]

A 1.2 to 10 times concentrated product for providing the alcoholic beverage according to any one of [1] to [12].

[13-1]

A 1.2 to 10 times concentrated product for providing the alcoholic beverage according to any one of [1] to [12-1].

[14]

A method for reducing alcohol's distinctive pungency of an alcoholic beverage, comprising adding one or more steviol glycosides selected from rebaudioside D and rebaudioside M to an alcoholic beverage at 0.001 to 0.5 g/1000 ml.

Advantageous Effects of Invention

According to an aspect of the present invention, an alcoholic beverage with reduced alcohol's distinctive pungency is provided. According to another aspect of the present invention, an alcoholic beverage with reduced alcohol's distinctive pungency having a low calorie content is provided. According to another aspect of the present invention, an alcoholic beverage with reduced alcohol's distinctive pungency having natural sweetness and good aftertaste is provided.

DESCRIPTION OF EMBODIMENTS

Figure 1:
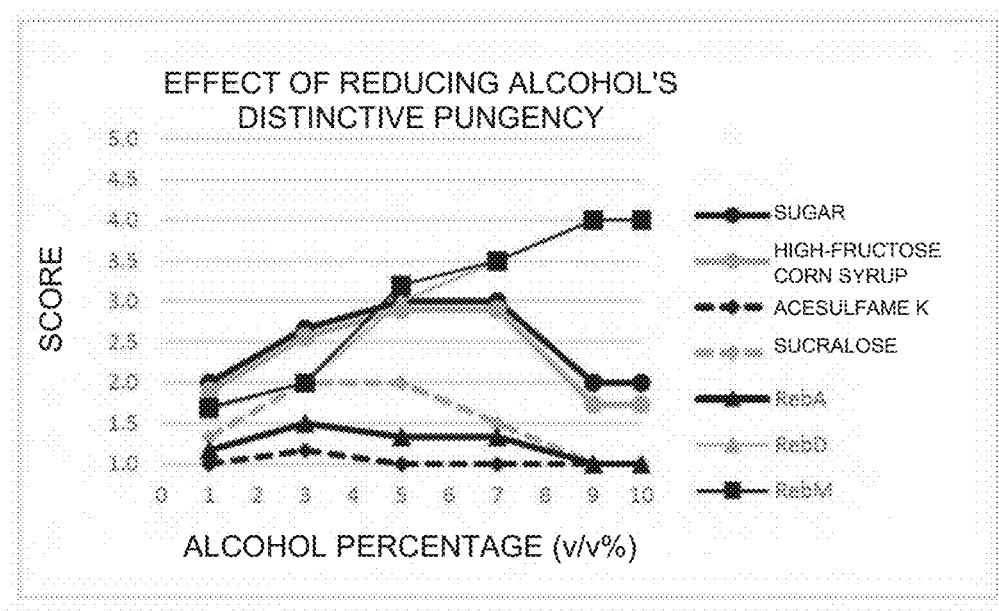
FIG. 1 is a graph showing the results of a sensory test for "reduction of alcohol's distinctive pungency" in Example 1.

Hereinafter, the present invention will be described. The following embodiments are examples shown for explaining the present invention, and are not intended to limit the present invention to these embodiments. The present invention can be implemented in various modes without departing from the spirit of the present invention.

All documents, laid-open publications, patent publications and other patent documents cited herein are incorporated herein by reference. The present description includes the contents of the descriptions and drawings of Japanese Patent Applications (Japanese Patent Application No. 2020-74933 and Japanese Patent Application No. 2020-188786) filed on Apr. 20, 2020 and Nov. 12, 2020, based on which priority to the present application is claimed.

As used herein, for example, the phrase "the content of component A is X g/1000 ml" means that "X g of component A is contained per 1000 ml of a beverage."

1. Alcoholic Beverage Containing Steviol Glycoside

In an aspect, the present invention provides the following alcoholic beverage (hereinafter, referred to as an "alcoholic beverage of the present invention"). The alcoholic beverage according to an embodiment of the present invention contains one or more steviol glycosides selected from rebaudioside D (or RebD) and rebaudioside M (or RebM), the content of the steviol glycosides is 0.001 to 0.5 g/1000 ml, and the alcohol content is 0.5 to 40.0 v/v %.

The alcoholic beverage according to a preferred embodiment of the present invention is easy to drink even at a high alcohol percentage (even with a high alcohol content) because alcohol's distinctive pungency is reduced. The alcoholic beverage according to a preferred embodiment of the present invention has natural sweetness and good aftertaste. In the alcoholic beverage according to a preferred embodiment of the present invention, total quality of taste is improved with respect to an alcoholic beverage free of one or more steviol glycosides selected from rebaudioside D and rebaudioside M. Further, the alcoholic beverage according to a preferred embodiment of the present invention contains substantially only naturally derived steviol glycosides or substantially only naturally derived steviol glycosides and natural low-intensity sweeteners as sweeteners, and therefore meets the needs of consumers who look for natural products. Here, the phrase "containing substantially only naturally derived steviol glycosides or substantially only naturally derived steviol glycosides and natural low-intensity sweeteners as sweeteners" means that the alcoholic beverage may contain other sweeteners in an amount equivalent to that of impurities or an amount below a sweetness threshold. The alcoholic beverage according to another preferred embodiment of the present invention contains steviol glycosides, and thus enables eliminated or reduced use of a sweetener having a high calorie content, such as sugar or high-fructose corn syrup, so that the calorie content can be kept low.

<Steviol Glycoside>

The steviol glycoside is a sweet substance having steviol, which is a type of diterpenoid contained in leaves of *Stevia rebaudiana*, as a backbone. Many steviol glycosides present sweetness several dozen to hundred times the sweetness of sugar, and therefore are used as non-caloric sweeteners in food and beverage industries. In leaves of conventional *Stevia* plants, stevioside in which three glucose molecules are bonded to the steviol backbone is present at the largest quantitative ratio, and rebaudioside A (or RebA) in which four glucose molecules are bonded to the steviol backbone is present at the second largest quantitative ratio. On the other hand, leaves of conventional *Stevia* plants contain only a very small amount of rebaudioside D and rebaudioside M having structures in which five and six glucose molecules are bonded, respectively. Therefore, sweeteners commonly used as *Stevia* sweeteners are those mainly containing stevioside and rebaudioside A. Examples of such *Stevia* sweeteners include sweeteners of Rebaudio J Series manufactured by MORITA KAGAKU KOGYO CO., LTD.

In the present invention, one or more selected from rebaudioside D and rebaudioside M are used as steviol glycosides. The present inventors have found that by adding rebaudioside D and/or rebaudioside M to an alcoholic beverage, an unexpected effect that is not shared by rebaudioside A commonly used heretofore is exhibited. Thus, the present inventors have arrived at the present invention. Rebaudioside D and rebaudioside M for use in the present invention may be extracted directly from *Stevia*, or may be obtained by chemically or biochemically adding glucose to a compound having a different structure and contained in a *Stevia* extract.

The content of rebaudioside D in the alcoholic beverage according to an embodiment of the present invention is 0.001 to 0.5 g/1000 ml. In another embodiment of the present invention, the content of rebaudioside D in the alcoholic beverage may be 0.005 to 0.5 g/1000 ml, 0.01 to 0.5 g/1000 ml, 0.02 to 0.5 g/1000 ml, 0.04 to 0.5 g/1000 ml, 0.05 to 0.5 g/1000 ml, 0.07 to 0.5 g/1000 ml, 0.1 to 0.5 g/1000 ml, 0.15 to 0.5 g/1000 ml, 0.2 to 0.5 g/1000 ml, 0.25 to 0.5 g/1000 ml, 0.3 to 0.5 g/1000 ml, 0.35 to 0.5 g/1000 ml, 0.4 to 0.5 g/1000 ml, 0.45 to 0.5 g/1000 ml, 0.005 to 0.45 g/1000 ml, 0.01 to 0.45 g/1000 ml, 0.02 to 0.45 g/1000 ml, 0.04 to 0.45 g/1000 ml, 0.05 to 0.45 g/1000 ml, 0.07 to 0.45 g/1000 ml, 0.1 to 0.45 g/1000 ml, 0.15 to 0.45 g/1000-ml, 0.2 to 0.45 g/1000 ml, 0.25 to 0.45 g/1000 ml, 0.3 to 0.45 g/1000 ml, 0.35 to 0.45 g/1000 ml, 0.4 to 0.45 g/1000 ml, 0.005 to 0.4 g/1000 ml, 0.01 to 0.4 g/1000 ml, 0.02 to 0.4 g/1000 ml, 0.04 to 0.4 g/1000 ml, 0.05 to 0.4 g/1000 ml, 0.07 to 0.4 g/1000 ml, 0.1 to 0.4 g/1000 ml, 0.15 to 0.4 g/1000 ml, 0.2 to 0.4 g/1000 ml, 0.25 to 0.4 g/1000 ml, 0.3 to 0.4 g/1000 ml, 0.35 to 0.4 g/1000 ml, 0.005 to 0.35 g/1000 ml, 0.01 to 0.35 g/1000 ml, 0.02 to 0.35 g/1000 ml, 0.04 to 0.35 g/1000 ml, 0.05 to 0.35 g/1000 ml, 0.07 to 0.35 g/1000 ml, 0.1 to 0.35 g/1000 ml, 0.15 to 0.35 g/1000 ml, 0.2 to 0.35 g/1000 ml, 0.25 to 0.35 g/1000 ml, 0.3 to 0.35 g/1000 ml, 0.005 to 0.3 g/1000 ml, 0.01 to 0.3 g/1000 ml, 0.02 to 0.3 g/1000 ml, 0.04 to 0.3 g/1000 ml, 0.05 to 0.3 g/1000 ml, 0.07 to 0.3 g/1000 ml, 0.1 to 0.3 g/1000 ml, 0.15 to 0.3 g/1000 ml, 0.2 to 0.3 g/1000 ml or 0.25 to 0.3 g/1000 ml. The content of rebaudioside D in the beverage may be calculated from the amount of a raw material added, or may be measured using a known analysis method such as liquid chromatography.

The content of rebaudioside M in the alcoholic beverage according to an embodiment of the present invention is 0.001 to 0.5 g/1000 ml. In another embodiment of the present invention, the content of rebaudioside M in the alcoholic beverage may be 0.005 to 0.5 g/1000 ml, 0.01 to 0.5 g/1000 ml, 0.02 to 0.5 g/1000 ml, 0.04 to 0.5 g/1000 ml, 0.05 to 0.5 g/100 ml, 0.07 to 0.5 g/1000 ml, 0.1 to 0.5 g/1000 ml, 0.15 to 0.5 g/1000 ml, 0.2 to 0.5 g/1000 ml, 0.25 to 0.5 g/1000 ml, 0.3 to 0.5 g/1000 ml, 0.35 to 0.5 g/1000 ml, 0.4 to 0.5 g/1000 ml, 0.45 to 0.5 g/1000 ml, 0.005 to 0.45 g/1000 ml, 0.01 to 0.45 g/1000 ml, 0.02 to 0.45 g/1000 ml, 0.04 to 0.45 g/1000 ml, 0.05 to 0.45 g/1000 ml, 0.07 to 0.45 g/1000 ml, 0.1 to 0.45 g/1000 ml, 0.15 to 0.45 g/1000 ml, 0.2 to 0.45 g/1000 ml, 0.25 to 0.45 g/1000 ml, 0.3 to 0.45 g/1000 ml, 0.35 to 0.45 g/1000 ml, 0.4 to 0.45 g/1000 ml, 0.005 to 0.4 g/1000 ml, 0.01 to 0.4 g/1000 ml, 0.02 to 0.4 g/1000 ml, 0.04 to 0.4 g/1000 ml, 0.05 to 0.4 g/100 ml, 0.07 to 0.4 g/1000 ml, 0.1 to 0.4 g/1000 ml, 0.15 to 0.4 g/1000 ml, 0.2 to 0.4 g/1000 ml, 0.25 to 0.4 g/1000 ml, 0.3 to 0.4 g/1000 ml, 0.35 to 0.4 g/1000 ml, 0.005 to 0.35 g/1000 ml, 0.01 to 0.35 g/1000 ml, 0.02 to 0.35 g/1000 ml, 0.04 to 0.35 g/1000 ml, 0.05 to 0.35 g/1000 ml, 0.07 to 0.35 g/1000 ml, 0.1 to 0.35 g/1000 ml, 0.15 to 0.35 g/1000 ml, 0.2 to 0.35 g/1000 ml, 0.25 to 0.35 g/1000 ml, 0.3 to 0.35 g/1000 ml, 0.005 to 0.3 g/1000 ml, 0.01 to 0.3 g/100 ml, 0.02 to 0.3 g/1000 ml, 0.04 to 0.3 g/1000 ml, 0.05 to 0.3 g/1000 ml, 0.07 to 0.3 g/1000 ml, 0.1 to 0.3 g/1000 ml, 0.15 to 0.3 g/1000 ml, 0.2 to 0.3 g/1000 ml or 0.25 to 0.3 g/1000 ml. The content of rebaudioside M in the beverage may be calculated from the amount of a raw material added, or may be measured using a known analysis method such as liquid chromatography.

The total content of rebaudioside D and rebaudioside M in the alcoholic beverage according to an embodiment of the present invention is 0.001 to 0.5 g/1000 ml. In another embodiment of the present invention, the total content of rebaudioside D and rebaudioside M in the alcoholic beverage may be 0.005 to 0.5 g/1000 ml, 0.01 to 0.5 g/1000 ml, 0.02 to 0.5 g/1000 ml, 0.04 to 0.5 g/1000 ml, 0.05 to 0.5 g/1000 ml, 0.07 to 0.5 g/1000 ml, 0.1 to 0.5 g/1000 ml, 0.15 to 0.5 g/1000 ml, 0.2 to 0.5 g/1000 ml, 0.25 to 0.5 g/1000 ml, 0.3 to 0.5 g/1000 ml, 0.35 to 0.5 g/1000 ml, 0.4 to 0.5 g/1000 ml, 0.45 to 0.5 g/1000 ml, 0.005 to 0.45 g/1000 ml, 0.01 to 0.45 g/1000 ml, 0.02 to 0.45 g/1000 ml, 0.04 to 0.45 g/1000 ml, 0.05 to 0.45 g/1000 ml, 0.07 to 0.45 g/1000 ml, 0.1 to 0.45 g/1000 ml, 0.15 to 0.45 g/1000 ml, 0.2 to 0.45 g/1000 ml, 0.25 to 0.45 g/1000 ml, 0.3 to 0.45 g/1000 ml, 0.35 to 0.45 g/1000 ml, 0.4 to 0.45 g/1000 ml, 0.005 to 0.4 g/1000 ml, 0.01 to 0.4 g/1000 ml, 0.02 to 0.4 g/1000 ml, 0.04 to 0.4 g/1000 ml, 0.05 to 0.4 g/1000 ml, 0.07 to 0.4 g/1000 ml, 0.1 to 0.4 g/1000 ml, 0.15 to 0.4 g/1000 ml, 0.2 to 0.4 g/1000 ml, 0.25 to 0.4 g/1000 ml, 0.3 to 0.4 g/1000 ml, 0.35 to 0.4 g/1000 ml, 0.005 to 0.35 g/1000 ml, 0.01 to 0.35 g/1000 ml, 0.02 to 0.35 g/1000 ml, 0.04 to 0.35 g/1000 ml, 0.05 to 0.35 g/1000 ml, 0.07 to 0.35 g/1000 ml, 0.1 to 0.35 g/1000 ml, 0.15 to 0.35 g/1000 ml, 0.2 to 0.35 g/1000 ml, 0.25 to 0.35 g/1000 ml, 0.3 to 0.35 g/1000 ml, 0.005 to 0.3 g/1000 ml, 0.01 to 0.3 g/1000 ml, 0.02 to 0.3 g/1000 ml, 0.04 to 0.3 g/1000 ml, 0.05 to 0.3 g/1000 ml, 0.07 to 0.3 g/1000 ml, 0.1 to 0.3 g/1000 ml, 0.15 to 0.3 g/1000 ml, 0.2 to 0.3 g/1000 ml or 0.25 to 0.3 g/1000 ml.

The alcoholic beverage of the present invention may contain steviol glycosides other than rebaudioside D and rebaudioside M as long as the effects of the present invention are not impaired. As such steviol glycosides, one or more steviol glycosides selected from the group consisting of rebaudioside A, rebaudioside B, rebaudioside C, rebaudioside D, rebaudioside E, rebaudioside F, rebaudioside I, rebaudioside J, rebaudioside K, rebaudioside N, rebaudioside O, rebaudioside Q, rebaudioside R, dulucoside A, dulucoside C, rubusoside, steviol, steviolmonoside, steviolbioside and stevioside may be further contained.

When other steviol glycosides are contained, the composition ratio, in terms of mass ratio, of the total amount of rebaudioside D and rebaudioside M to the total amount of other steviol glycosides may be 99:1 to 50:50, 95:5 to 55:45, 90:10 to 60:40, 85:15 to 65:35, 80:20 to 70:30, 80:20 to 75:25, 99:1 to 85:5, 98:2 to 86:14, 97:3 to 87:13, 96:4 to 88:12 or 95:5 to 89:11.

<Alcoholic Beverage>

The alcoholic beverage is a beverage containing alcohol, and the alcohol mentioned here means ethyl alcohol (ethanol) unless otherwise specified. The alcoholic beverage according to the present invention contains alcohol at 0.5 to 40.0 v/v %. Herein, the alcohol content is expressed in percentage on a volume/volume basis (v/v %). The alcohol content of the beverage can be measured by a method specified by National Tax Agency JAPAN. For example, the alcohol content can be measured with a vibrating type densimeter. Specifically, the alcohol content can be determined by preparing a sample with carbon dioxide gas removed from a beverage by filtration or ultrasound, then distilling the sample, measuring the density of the resulting distillate at 15° C., and performing conversion using "Table 2: Conversion Table between Alcohol Content and Density (15° C.) and Specific Gravity (15/15° C.)" which is a table appended to the Official Analysis Method of National Tax Agency (National Tax Agency Instructions No. 6, 2007, revised on Jun. 22, 2007). When the alcohol percentage of liquor to be used is known, the alcohol content can be calculated from the alcohol percentage and addition amount.

The alcohol component to be used for the alcoholic beverage of the present invention is not particularly limited. Any raw material can be used as long as it is a potable alcohol component such as spirit, liqueur, Japanese distilled spirit, whisky, brandy, raw material alcohol (e.g. neutral alcohol), plum wine, fruit wine or sweet fruit wine.

The alcohol content of the alcoholic beverage in an embodiment of the present invention may be 0.6 to 39.8 v/v %, 0.6 to 35.0 v/v %, 0.6 to 30.0 v/v %, 0.6 to 25.0 v/v %, 0.6 to 20.0 v/v %, 0.6 to 15.0 v/v %, 0.6 to 12.0 v/v %, 1.0 to 39.8 v/v %, 1.0 to 35.0 v/v %, 1.0 to 30.0 v/v %, 1.0 to 25.0 v/v %, 1.0 to 20.0 v/v %, 1.0 to 15.0 v/v %, 1.0 to 12.0 v/v %, 3.0 to 35.0 v/v %, 3.0 to 30.0 v/v %, 3.0 to 25.0 v/v %, 3.0 to 20.0 v/v %, 3.0 to 15.0 v/v %, 3.0 to 12.0 v/v %, 5.0 to 35.0 v/v %, 5.0 to 30.0 v/v %, 5.0 to 25.0 v/v %, 5.0 to 20.0 v/v %, 5.0 to 15.0 v/v %, 5.0 to 12.0 v/v %, 0.6 to 9.8 v/v %, 0.8 to 9.5 v/v %, 1.0 to 9.0 v/v %, 1.5 to 8.5 v/v %, 2.0 to 8.0 v/v %, 2.5 to 7.5 v/v %, 3.0 to 7.0 v/v %, 3.5 to 6.5 v/v %, 4.0 to 6.0 v/v %, 4.5 to 5.5 v/v %, 5.0 to 10.0 v/v %, 5.0 to 9.5 v/v %, 5.0 to 9.0 v/v %, 5.0 to 8.5 v/v %, 5.0 to 8.0 v/v %, 5.0 to 7.5 v/v %, 5.5 to 10.0 v/v %, 5.5 to 9.5 v/v %, 5.5 to 9.0 v/v %, 5.5 to 8.5 v/v %, 5.5 to 8.0 v/v %, 5.5 to 7.5 v/v %, 6.0 to 10.0 v/v %, 6.0 to 9.5 v/v %, 6.0 to 9.0 v/v %, 6.0 to 8.5 v/v %, 6.0 to 8.0 v/v %, 6.0 to 7.5 v/v %, 6.5 to 10.0 v/v %, 6.5 to 9.5 v/v %, 6.5 to 9.0 v/v %, 6.5 to 8.5 v/v %, 6.5 to 8.0 v/v %, 6.5 to 7.5 v/v %, 7.0 to 10.0 v/v %, 7.0 to 9.5 v/v %, 7.0 to 9.0 v/v %, 7.0 to 8.5 v/v %, 7.0 to 8.0 v/v %, 7.0 to 7.5 v/v %, 2.0 to 7.0 v/v %, 2.0 to 6.0 v/v %, 2.0 to 5.0 v/v %, 3.0 to 7.0 v/v %, 3.0 to 6.0 v/v % or 3.0 to 5.0 v/v %.

The alcohol content of the alcoholic beverage in another embodiment of the present invention may be 18.0 to 40.0 v/v %, 18.0 to 35.0 v/v %, 18.0 to 30.0 v/v %, 18.0 to 25.0 v/v %, 20.0 to 40.0 v/v %, 20.0 to 35.0 v/v %, 20.0 to 30.0 v/v %, 20.0 to 25.0 v/v %, 25.0 to 40.0 v/v %, 25.0 to 35.0 v/v %, 25.0 to 30.0 v/v % or 30.0 to 40.0 v/v %.

The alcoholic beverage of the present invention may be a sparkling beverage. As used herein, the term "sparkling beverage" refers to a beverage in which bubbles are generated from the beverage. The sparkling beverage include, for example, beverages which have a bubble layer formed on a liquid level thereof when poured into a container. Examples of the sparkling beverage include carbonated beverages. The carbonated beverage is a beverage containing carbon dioxide gas, and such beverages containing carbon dioxide gas include beverages obtained by injecting carbon dioxide gas into a beverage separately, beverages obtained using carbonated water for a raw material, and beverages with carbon dioxide gas generated by fermenting a part of a raw material. The gas pressure of the sparkling beverage is not particularly limited, and may be 0.5 to 5.0 kgf % cm$^2$, 0.5 to 4.5 kgf/cm$^2$, 0.5 to 4.0 kgf/cm$^2$, 0.5 to 3.5 kgf/cm$^2$, 0.5 to 3.0 kgf/cm$^2$, 0.5 to 2.5 kgf/cm$^2$, 0.5 to 2.0 kgf/cm$^2$, 0.5 to 1.5 kgf/cm$^2$, 1.0 to 5.0 kgf/cm$^2$, 1.0 to 4.5 kgf/cm$^2$, 1.0 to 4.0 kgf/cm$^2$, 1.0 to 3.5 kgf/cm$^2$, 1.0 to 3.0 kgf/cm$^2$, 1.0 to 2.5 kgf/cm$^2$, 1.0 to 2.0 kgf/cm$^2$, 1.0 to 1.5 kgf/cm$^2$, 1.5 to 5.0 kgf/cm$^2$, 1.5 to 4.5 kgf/cm$^2$, 1.5 to 4.0 kgf/cm$^2$, 1.5 to 3.5 kgf/cm$^2$, 1.5 to 3.0 kgf/cm$^2$, 1.5 to 2.5 kgf/cm$^2$, 1.5 to 2.0 kgf/cm$^2$, 2.0 to 5.0 kgf/cm$^2$, 2.0 to 4.5 kgf/cm$^2$, 2.0 to 4.0 kgf/cm$^2$, 2.0 to 3.5 kgf/cm$^2$, 2.0 to 3.0 kgf/cm$^2$, 2.0 to 2.5 kgf/cm$^2$, 2.2 to 4.0 kgf/cm$^2$, 2.2 to 3.5 kgf/cm$^2$, 2.2 to 3.3 kgf/cm$^2$, 2.2 to 3.2 kgf/cm$^2$, 2.3 to 4.0 kgf/cm$^2$, 2.3 to 3.5 kgf/cm$^2$, 2.3 to 3.2 kgf/cm$^2$, 3.0 to 4.0 kg/cm$^2$, 3.0 to 3.5 kgf/cm$^2$, 1.1 to 2.4 kgf/cm$^2$, 1.2 to 2.3 kgf/cm$^2$, 1.3 to 2.2 kgf/cm$^2$ or 1.4 to 2.1 kgf/cm$^2$. The content of gas in the sparkling beverage can be defined by a gas pressure. As used herein, the term "gas pressure" refers to a gas pressure of carbon dioxide gas in a sparkling beverage in a container unless otherwise specified. The gas pressure can be measured by fixing a beverage at a liquid temperature of 20° C. on a gas internal pressure gauge, removing carbon dioxide gas in a head space by opening a stopper cock of the internal pressure gauge once to make the beverage open to the atmosphere, then closing the stopper cock again, shaking the gas internal pressure gauge, and reading a value at the time when a pointer reaches a certain position. Herein, the gas pressure of the sparkling beverage is measured using such a method unless otherwise specified.

The taste (flavor) of the alcoholic beverage in an embodiment of the present invention is not particularly limited, and can be adjusted to any of various tastes. For example, the alcoholic beverage of the present invention may be a beverage flavored with any of citruses (e.g. mandarin orange, *Citrus hassaku,* Iyokan orange, navel orange, Valencia orange, *Citrus tamurana, Citrus unshiu sinensis, Citrus reticulata, Citrus grandis,* grapefruit, lemon, shekwasha, Yuzu and Chinese orange), pomaceous fruits (e.g. apple, Japanese pear, pear, Japanese persimmon, loquat, pomegranate and Chinese quince), stone fruits (e.g. peach. Japanese plum, nectarine, Japanese plum and apricot), berry fruits (e.g. grape and fig), nuts (e.g. chestnut, almond, pistachio and cashewnut), tropical or semitropical fruits (e.g. pineapple, banana, papaya, lychee, kiwifruit and mango), fruity vegetables (e.g. strawberry, melon, water melon and papaya), root vegetables (e.g. carrot and sweet potato), leaf or stem vegetables (e.g. celery), fruit vegetables (e.g. cucumber, pumpkin, tomato and sweet corn), savory herbs and garnishes (e.g. ginger, perilla, red pepper, cinnamon bark and pepper), energy drinks, coffee, teas (e.g. black tea, green tea, oolong tea, roasted green tea, jasmine tea and various herb teas), cocoa, cola, desserts (e.g. almond jerry) or milky beverages (e.g. yoghurt and milk). The taste of the alcoholic beverage of the present invention can be adjusted by adding components approved as food additives, or components which are not approved as food additives, but have been eaten for many years and are generally recognized as being safe, for example, fruit juice, acidic flavor substances, flavoring agents, plant extracts, milk contents and other flavors.

The form of the alcoholic beverage in an embodiment of the present invention is not limited, and may be, for example, a form of a packaged alcoholic beverage in which the alcoholic beverage is encapsulated into any of containers such as cans, bottles, PET bottles, pouches, cartons and plastic containers, and packaged. When the alcoholic beverage is heat-sterilized after being packaged, there is no particular limitation on the type of the heat sterilization, and a common method such as UHT sterilization or retort sterilization can be used. The temperature for the heat sterilization process is not particularly limited, and the heat sterilization is performed at, for example, 65 to 130° C., preferably 85 to 120° C., for 10 to 40 minutes. It is to be noted that sterilization may be performed at an appropriate temperature for several seconds, e.g. 5 to 30 seconds as long as it is possible to obtain a sterilization effect equivalent to that obtained under the above-described conditions.

<Sweetness Intensity>

As used herein, the term "sweetness intensity" means the intensity of sweetness presented by a substance. For example, herein, where the degree of sweetness presented by sucrose per Brix 1 as a unit concentration is defined as 1 degree of sweetness, rebaudioside A, rebaudioside D and rebaudioside M each have about 300 times degrees of sweetness. The numerical value obtained by multiplying the above-mentioned degree of sweetness by the concentration (w/v % (which may be equated with w/w % in the case of a beverage)) of the sweetener in the alcoholic beverage of the present invention is a sweetness intensity of the alcoholic beverage of the present invention. For a high-intensity sweetener showing a range in the degree of sweetness, a center value thereof is used unless otherwise specified when the sweetness intensity is calculated in the present invention. The sweetness intensity of the alcoholic beverage of the present invention may not be one that is derived only from rebaudioside D and/or rebaudioside M, and when optional sweeteners described later are contained, a total value inclusive of sweetness intensities derived from these sweeteners is adopted. For example, the degree of sweetness of a Siraitia grosvenorii extract is 110 to 150 (center value: 130), the degree of sweetness of mogroside V is 240 to 300 (center value: 270), and the degree of sweetness of thaumatin is 2,000. The degrees of sweetness of general low-intensity sweeteners are as shown in Table 1. Where the sweetness intensity presented by a sucrose solution per Brix 1 as a unit concentration is defined as 1 degree of sweetness, the degree of sweetness of glucose is 0.6 to 0.7 (center value: 0.65). The numerical value obtained by multiplying this degree of sweetness by a Brix value as a concentration of glucose is a sweetness intensity of a glucose solution. Therefore, when the concentration of glucose is Brix 1.5, the sweetness intensity of the glucose solution is 0.65×1.5=0.975. Relative ratios of sweetness of other sweeteners against the sweetness of sucrose, which is defined as 1, can be determined from a known sugar sweetness conversion table (e.g. "Inryo Yogo Jiten ("Dictionary of Beverage Terminology" in Japanese)", p. 11, published by Beverage Japan, Inc.), or the like. For sweeteners whose relative ratios of sweetness against the sweetness of sucrose, which is defined as 1, are unknown, or sweeteners whose values vary depending on documents, the relative ratio of sweetness against the sweetness of sucrose, which is defined as 1, may be determined by a sensory test. Examples of the sensory test include a method in which samples are prepared by adding sugar to pure water with the sweetness intensity incremented by 0.5 from 3.0 up to 5.0, and from these samples, a sugar-containing sample equal in sweetness intensity to a sweetener aqueous solution at a predetermined concentration is selected.

TABLE 1

| Sugar (D-form) | Degree of sweetness |
|---|---|
| Sucrose | 1 |
| Glucose | 0.6 to 0.7 |
| Fructose | 1.3 to 1.7 |
| Maltose | 0.4 |
| Fructooligosaccharide | 0.6 |
| Maltooligosaccharide | 0.3 |
| Isomaltooligosaccharide | 0.4 to 0.5 |
| Galactooligosaccharide | 0.7 |
| Lactose | 0.2 to 0.3 |
| Psicose | 0.7 |
| Allose | 0.8 |
| Tagatose | 0.9 |
| High-fructose corn syrup | 0.75 |

The sweetness intensity of the alcoholic beverage according to an embodiment of the present invention, which varies depending on a specific beverage, is preferably about 0.1 to 20, and may be, for example 0.1 to 18, 0.1 to 15, 0.5 to 14.5, 1.0 to 14.0, 1.5 to 13.5, 2.0 to 13.0, 2.5 to 12.5, 3.0 to 12.0, 3.5 to 11.5, 4.0 to 11.0, 4.5 to 10.5, 5.5 to 10.0, 6.0 to 9.5, 6.5 to 9.0, 7.0 to 8.5, 7.5 to 8.0, 4.5 to 12.5, 4.5 to 10.0, 4.5 to 7.5, 5.5 to 12.5, 5.5 to 10.0, 5.5 to 7.5, 6.5 to 12.5, 6.5 to 10.0 or 6.5 to 7.5.

The sweetness intensity of the alcoholic beverage according to another embodiment of the present invention may be more than 20 and 50 or less. For example, the sweetness intensity of the alcoholic beverage according to another embodiment of the present invention may be 21 to 50, 25 to 50, 30 to 50, 35 to 50, 40 to 50, 21 to 45, 25 to 45, 30 to 45, 35 to 45, 21 to 40, 25 to 40, 30 to 40, 21 to 35 or 25 to 35. For example, in alcoholic beverages (including liqueur etc.) having a relatively high alcohol content (e.g. 18.0 to 40.0 v/v %), the sweetness intensity according to the present embodiment is preferable. The alcoholic beverage according to an embodiment of the present invention, whose sweetness intensity is in the range of more than 20 and 50 or less, may be diluted with water or carbonated water at the time of drinking like a concentrated liquid described later.

<Optional Other Sweeteners>

(Low-Intensity Sweetener)

The alcoholic beverage in an embodiment of the present invention may further contain a low-intensity sweetener as long as the effects of the present invention are not impaired. Herein, the low-intensity sweetener means a sweetener having a degree of sweetness about equal to or lower than that of sucrose. For example, the low-intensity sweetener presents sweetness 0.1 times or more and less than 5 times, less than 3 times, less than 2 times, less than 1.5 times, less than 1.0 time, less than 0.8 times, less than 0.7 times, less than 0.6 times, less than 0.5 times or less than 0.4 times the sweetness of the same amount of sucrose. Examples of the low-intensity sweetener that can be used in the present invention include sweeteners selected from glucose, sucrose, fructose, maltose, oligosaccharides, high-fructose corn syrup, lactose, psicose, allose, tagatose, xylose, ribose and combinations thereof. The alcoholic beverage in a preferred embodiment of the present invention contains glucose, fructose, sucrose, high-fructose corn syrup or rare sugars (e.g. psicose (allulose), xylitol and erythritol).

Low-intensity sweeteners which are often used in beverages etc., such as sucrose and high-fructose corn syrup, have high energy, and thus the energy (calorie content) of the alcoholic beverage can be significantly reduced when the content of low-intensity sweeteners is reduced. In an embodiment of the present invention, a combination of low-intensity sweeteners and rebaudioside D and/or rebaudioside M allows sufficient sweetness to be felt at the time of ingestion while the concentration of low-intensity sweeteners is kept low to attain low energy (i.e. low calorie content). Therefore, the content of low-intensity sweeteners is preferably an amount which provides an energy of not more than 100 Kcal/100 ml. Depending on an embodiment, the energy of the alcoholic beverage can be 0 to 100 Kcal/100 ml, 0 to 95 Kcal/100 ml, 0 to 90 Kcal/100 ml, 0 to 85 Kcal/100 ml, 0 to 80 Kcal/100 ml, 0 to 75 Kcal/100 ml, 0 to 70 Kcal/100 ml, 0 to 65 Kcal/100 ml, 0 to 60 Kcal/100 ml, 0 to 55 Kcal/100 ml, 0 to 50 Kcal/100 ml, 0 to 45 Kcal/100 ml, 0 to 40 Kcal/100 ml, 0 to 35 Kcal/100 ml, 0 to 30 Kcal/100 ml, 0 to 25 Kcal/100 ml, 0 to 20 Kcal/100 ml, 0 to 15 Kcal/100 ml, 0 to 10 Kcal/100 ml, 0 to 5 Kcal/100 ml, 5 to 90 Kcal/100 ml, 5 to 80 Kcal/100 ml, 5 to 70 Kcal/100 ml, 5 to 60 Kcal/100 ml, 5 to 55 Kcal/100 ml, 5 to 50 Kcal/100 ml, 5 to 45 Kcal/100 ml, 5 to 40 Kcal/100 ml, 5 to 35 Kcal/100 ml, 5 to 30 Kcal/100 ml, 5 to 25 Kcal/100 ml, 5 to 20 Kcal/100 ml, 5 to 15 Kcal/100 ml, 5 to 10 Kcal/100 ml, 10 to 90 Kcal/100 ml, 10 to 80 Kcal/100 ml, 10 to 70 Kcal/100 ml, 10 to 60 Kcal/100 ml, 10 to 55 Kcal/100 ml, 10 to 50 Kcal/100 ml, 10 to 45 Kcal/100 ml, 10 to 40 Kcal/100 ml, 10 to 35 Kcal/100 ml, 10 to 30 Kcal/100 ml, 10 to 25 Kcal/100 ml, 10 to 20 Kcal/100 ml, 10 to 15 Kcal/100 ml, 15 to 90 Kcal/100 ml, 15 to 80 Kcal/100 ml, 15 to 70 Kcal/100 ml, 15 to 60 Kcal/100 ml, 15 to 55 Kcal/100 ml, 15 to 50 Kcal/100 ml, 15 to 45 Kcal/100 ml, 15 to 40 Kcal/100 ml, 15 to 35 Kcal/100 ml, 15 to 30 Kcal/100 ml, 15 to 25 Kcal/100 ml, 15 to 20 Kcal/100 ml, 20 to 90 Kcal/100 ml, 20 to 80 Kcal/100 ml, 20 to 70 Kcal/100 ml, 20 to 60 Kcal/100 ml, 20 to 55 Kcal/100 ml, 20 to 50 Kcal/100 ml, 20 to 45 Kcal/100 ml, 20 to 40 Kcal/100 ml, 20 to 35 Kcal/100 ml, 20 to 30 Kcal/100 ml, 20 to 25 Kcal/100 ml, 25 to 90 Kcal/1100 ml, 25 to 80 Kcal/100 ml, 25 to 70 Kcal/100 ml, 25 to 60 Kcal/100 ml, 25 to 55 Kcal/100 ml, 25 to 50 Kcal/100 ml, 25 to 45 Kcal/100 ml, 25 to 40 Kcal/100 ml, 25 to 35 Kcal/100 ml or 25 to 30 Kcal/100 ml. The energy of the sweet substance or alcohol is known, or can be determined by, for example, measuring a content by HPLC or the like and multiplying the content by an energy conversion factor to calculate the energy, or measuring physical combustion heat with a calorimeter (e.g. bomb calorimeter) and correcting the value by a digestibility coefficient, an eliminated amount of heat and the like.

The energy of the alcoholic beverage according to another embodiment of the present invention may be more than 100 Kcal/100 ml and 250 Kcal/100 ml or less. For example, the energy of the alcoholic beverage according to another embodiment of the present invention can be 110 to 250 Kcal/100 ml, 130 to 250 Kcal/100 ml, 150 to 250 Kcal/100 ml, 180 to 250 Kcal/100 ml, 110 to 230 Kcal/100 ml, 130 to 230 Kcal/100 ml, 150 to 230 Kcal/100 ml, 180 to 230 Kcal/100 ml, 110 to 200 Kcal/100 ml, 130 to 200 Kcal/100 ml, 150 to 200 Kcal/100 ml or 180 to 200 Kcal/100 ml. The energy of the sweet substance or alcohol is known, or can be determined by, for example, measuring a content by HPLC or the like and multiplying the content by an energy conversion factor to calculate the energy, or measuring physical combustion heat with a calorimeter (e.g. bomb calorimeter) and correcting the value by a digestibility coefficient, an eliminated amount of heat and the like. For example, in alcoholic beverages (including liqueur etc.) having a relatively high alcohol content (e.g. 18.0 to 40.0 v/v %), the energy according to the present embodiment is preferable. The alcoholic beverage according to an embodiment of the present invention, whose energy is in the range of more than 100 Kcal/100 ml and 200 Kcal/100 ml or less, may be diluted with water or carbonated water at the time of drinking like a concentrated liquid described later.

(High-Intensity Sweetener)

The alcoholic beverage in an embodiment of the present invention may further contain high-intensity sweeteners other than the above-described steviol glycosides as long as the effects of the present invention are not impaired. As used herein, the term "high-intensity sweetener" means a compound having more intense sweetness over sucrose, and the high-intensity sweetener may be a naturally derived compound, a synthetic compound or a combination of a naturally derived compound and a synthetic compound. The high-intensity sweetener has sweetness 5 times or more, 10 times or more, 50 times or more, 100 times or more, 500 times or more, 1000 times or more, 5000 times or more, 10000 times or more, 50000 times or more or 100000 times or more the sweetness of the same amount of sucrose. The above-described steviol glycoside is also a type of high-intensity sweetener.

Specific examples of the high-intensity sweetener include peptide-based sweeteners such as aspartame, neotame and advantame, for example, sucrose derivatives such as sucralose, for example, synthetic sweeteners such as acesulfame potassium (acesulfame K), saccharin, saccharin sodium, sodium cyclamate, dulcin, disodium glycyrrhizinate, trisodium glycyrrhizinate and neohesperidin dihydrochalcone (including those that are naturally present but are distributed mainly as synthetic products like neohesperidin dihydrochalcone), for example, sweeteners extracted from plants, such as thaumatin, monellin, curculin, mabinlin, brazzein, pentadin, hemundulcin, 4β-hydroxyhemundulcin, miraclin, glycyrrhizin, rubusoside and phyllodulcin, or plant extracts containing high-intensity sweetener components, Siraitia grosvenorii extracts, *Glycyrrhiza glabra* extracts, *Rubus suavissimus* S. Lee extracts, *Hydrangea macrophylla* var. *thunbergii* extracts, *Sclerochiton ilicifolius* extracts, *Thaumataococcus daniellii* Benth extracts, *Dioscoreophyllum volkensii* extracts, *Curculigo latifolia* extracts, *Richadella dulcifica* extracts, *Pentadiplandra brazzeana* extracts, *Capparis masaikai* extracts, *Lippia dulcis* extracts and the like, Mogrosides (e.g. Mogroside V and Mogroside IV) obtained by treating sweet components in such extracts. Siraitia grosvenorii and Siraitia grosvenorii extracts, glycosides obtained from plant extracts, such as phyllodulcin glycosides, sweet components contained in *Glycyrrhiza glabra* plants (e.g. triterpene glycosides such as glycyrrhizin), sweet components contained in *Rubus suavissimus* S. Lee plants (e.g. diterpene glycosides such as rubusoside), sweet components contained in *Hydrangea acrophylla* var. *thunbergii* plants (e.g. dihydroisocoumarins such as phyllodulcin), sweet components contained in *Sclerochiton ilicifolius* plants (e.g. amino acids such as monatin), sweet components contained in *Thaumataococcus daniellii* Benth plants (e.g. proteins such as thaumatin), sweet components contained in *Dioscoreophyllum volkensii* plants (e.g. proteins such as monellin), sweet components contained in *Curculigo latifolia* plants (e.g. proteins such as curculin), sweet components contained in *Richadella dulcifica* plants (e.g. proteins such as miraclin), sweet components contained in *Pentadiplandra bralreana* plants (e.g. proteins such as brazzein and pentadin), sweet components contained in *Capparis masaikai* plants (e.g. proteins such as mabinlin), and sweet components contained in *Lippia dulcis* plants (e.g. sesquiterpenes such as hemundulcin and 4β-hydroxyhemundulcin).

The alcoholic beverage in another embodiment of the present invention may contain high-intensity sweeteners other than rebaudioside D and rebaudioside M, for example, peptide-based sweeteners, sucrose derivatives or synthetic sweeteners, in addition to rebaudioside D and/or rebaudioside M. For example, the alcoholic beverage in another embodiment of the present invention may contain one or more high-intensity sweeteners selected from acesulfame K and sucralose, in addition to rebaudioside D and/or rebaudioside M. That is, the alcoholic beverage in another embodiment of the present invention may contain only acesulfame K, only sucralose, or a combination of acesulfame K and sucralose. The total content of one or more high-intensity sweeteners selected from acesulfame K and sucralose may be 0.010 g/1000 ml to 0.400 g/1000 ml, for example, 0.020 g/1000 ml to 0.350 g/1000 ml, 0.050 g/1000 ml to 0.300 g/1000 ml, or 0.050 g/1000 ml to 0.250 g/1000 ml. When the alcoholic beverage in another embodiment of the present invention contains one or more high-intensity sweeteners selected from acesulfame K and sucralose, the ratio of the total sweetness intensity of rebaudioside D and rebaudioside M to the total sweetness intensity may be 25 to 95%, 30 to 95%, 40 to 95%, 50 to 95%, 60 to 95%, 70 to 95% or 80 to 95%.

Where the degree of sweetness of sucrose is 1, the degree of sweetness of the Siraitia grosvenorii extract is about 110 to 150 (center value: 130), the degree of sweetness of mogroside V is about 240 to 300 (center value: 270), the degree of sweetness of thaumatin is about 2,000, the degree of sweetness of acesulfame is about 200, the degree of sweetness of sucralose is about 600 and the degree of sweetness of aspartame is about 180. Relative ratios of sweetness of various sweeteners against the sweetness of sucrose, which is defined as 1, can be determined from a known sugar sweetness conversion table (e.g. "Inryo Yogo Jiten ("Dictionary of Beverage Terminology" in Japanese)", p. 11, published by Beverage Japan, Inc.), or the like. It is to be noted that for sweeteners whose values of sweetness are described as a range of numerical values, or sweeteners whose values vary depending on documents, the relative ratio of sweetness against the sweetness of sucrose, which is defined as 1, is determined by a sensory test. Examples of the sensory test include a method in which samples are prepared by adding sugar to pure water with the sweetness intensity incremented by 0.5 from 3.0 up to 5.0, and from these samples, a sugar-containing sample equal in sweetness intensity to a sweetener aqueous solution at a predetermined concentration is selected.

Regarding the content of sweeteners other than steviol glycosides, in the case of high-intensity sweeteners (e.g. mogroside V and artificial sweeteners), the composition ratio, in terms of mass ratio, of the total amount of rebaudioside D and rebaudioside M to the total amount of high-intensity sweeteners other than steviol glycosides in the alcoholic beverage of the present invention may be 99:1 to 50:50, 95:5 to 55:45, 90:10 to 60:40, 85:15 to 65:35, 80:20 to 70:30, 80:20 to 75:25, 99:1 to 85:5, 98:2 to 86:14, 97:3 to 87:13, 96:4 to 88:12 or 95:5 to 89:11. When the alcoholic beverage of the present invention contains low-intensity sweeteners (e.g. sucrose and high-fructose corn syrup), the composition ratio, in terms of weight ratio, of the total amount of rebaudioside D and rebaudioside M to the total amount of low-intensity sweeteners in the alcoholic beverage may be 1:1000 to 1:100, 1:800 to 1:100, 1:700 to 1:100, 1:600 to 1:100, 1:500 to 1:100, 1:400 to 1:100, 1:300 to 1:100 or 1:200 to 1:100.

<Acidic Flavor Substance>

The alcoholic beverage according to an embodiment of the present invention may further contain an acidic flavor substance. The acidic flavor substance is not particularly limited as long as it can impart acidic flavor to a beverage, and examples thereof include ascorbic acid, phosphoric acid, citric acid, gluconic acid, tartaric acid, lactic acid, malic acid, phytic acid, acetic acid, succinic acid, glucono-delta-lactone, or salts thereof. Examples of the salt include sodium citrate and sodium ascorbate. Among these acidic flavor substances, ascorbic acid, phosphoric acid, citric acid, gluconic acid, tartaric acid, lactic acid, malic acid, phytic acid, acetic acid, succinic acid or salts thereof are preferable, and phosphoric acid, citric acid, lactic acid, tartaric acid, acetic acid or salts thereof are more preferable. These acidic flavor substances may be used alone, or used in combination of two or more thereof.

The alcoholic beverage according to an embodiment of the present invention may contain the above-described acidic flavor substances at a concentration such that the acidity is within the range of 0.01 to 1.0 w/v %. As used herein, the term "acidity" means an acidity, in terms of citric acid, of an acidic flavor substance contained in the alcoholic beverage. The acidity may be in the range of 0.02 to 0.95 w/v %, 0.04 to 0.90 w/v %, 0.06 to 0.85 w/v %, 0.08 to 0.80 w/v %, 0.10 to 0.75 w/v %, 0.12 to 0.70 w/v %, 0.14 to 0.65 w/v %, 0.16 to 0.60 w/v %, 0.18 to 0.55 w/v %, 0.20 to 0.50 w/v %, 0.22 to 0.45 w/v %, 0.24 to 0.40 w/v % or 0.26 to 0.35 w/v %.

The acidity (in terms of citric acid) of the alcoholic beverage of the present invention can be measured by, for example, a neutralization titration method using an automatic potentiometric titrator (e.g. AT-500N manufactured by KYOTO ELECTRONICS MANUFACTURING CO., LTD.). Specifically, to 10 ml of a beverage sample is added distilled water to a total amount of 50 ml, and a sodium hydroxide solution (0.1 N, reagent for volumetric analysis) is then dropped from a burette with stirring until the pH is 8.0. Subsequently, the acidity in terms of citric acid may be calculated in accordance with the following equation.

"total beverage acidity (w/v %)"=titer (ml)×$F$×$A$× (100/amount of sample (ml))

F: about 1.00 (factor of 0.1 N sodium hydroxide solution)
A: 0.0064 (the number of grams of citric acid equivalent to 1 ml of sodium hydroxide solution)

The amount of an acidic flavor substance blended in the carbonated beverage according to the present invention can be determined by a known method such as a HPLC method. When the amount of citric acid added is known and other acidic flavor substances are not added, the acidity can be calculated from the amount of citric acid added.

The alcoholic beverage according to an embodiment of the present invention contains sweeteners and acidic flavor substances, and the ratio between the values of the associated sweetness intensity and acidity, i.e. "sweetness intensity/acidity" (also referred to as a sweetness-acidity ratio) may be 1.0 to 150, or 1.0 to 700. In another embodiment of the present invention, the value of sweetness intensity/acidity may be 1.5 to 700, 2.0 to 700, 2.0 to 600, 2.0 to 500, 2.0 to 400, 2.0 to 300, 2.0 to 200, 2.0 to 150, 2.0 to 100, 2.0 to 80, 2.0 to 60, 20 to 150, 20 to 100, 20 to 80 or 20 to 60. In the case of an alcoholic beverage with a clean taste, the value of sweetness intensity/acidity may be, for example, 2.0 to 25, 2.0 to 20, 2.0 to 15, 2.0 to 10, 2.0 to 8.0, 2.0 to 5.0, 3.0 to 25, 3.0 to 20, 3.0 to 15, 3.0 to 10, 3.0 to 8.0, 3.0 to 5.0, 5.0 to 25, 5.0 to 20, 5.0 to 15 or 5.0 to 10. In the case of an alcoholic beverage with a steady taste, the value of sweetness intensity/acidity may be, for example, 20 to 150, 20 to 100, 20 to 80, 20 to 70, 20 to 60, 20 to 50, 20 to 40, 20 to 30, 25 to 80, 25 to 70, 25 to 60, 25 to 50, 25 to 40, 30 to 80, 30 to 70, 30 to 60, 30 to 50 or 30 to 40.

<Sodium>

The alcoholic beverage in an embodiment of the present invention may contain sodium. The alcoholic beverage in an embodiment of the present invention may contain potassium described later in addition to sodium. Herein, the phrase "the content of sodium in the alcoholic beverage is 5 to 200 mg/100 ml" means that the content of sodium atoms is 5 to 200 mg/100 ml. Depending on an embodiment, the content of sodium may be more than 0 and 250 mg/100 ml or less, 5 to 200 mg/100 ml, 10 to 200 mg/10 ml, 10 to 190 mg/100 ml, 10 to 180 mg/100 ml, 10 to 170 mg/100 ml, 10 to 160 mg/100 ml, 10 to 150 mg/100 ml, 10 to 140 mg/100 ml, 10 to 130 mg/100 ml, 10 to 120 mg/100 ml, 10 to 110 mg/100 ml, 10 to 100 mg/100 ml, 10 to 90 mg/100 ml, 10 to 80 mg/100 ml, 10 to 70 mg/100 ml, 10 to 60 mg/100 ml, 10 to 55 mg/100 ml, 10 to 50 mg/100 ml, 10 to 45 mg/100 ml, 10 to 40 mg/100 ml, 10 to 35 mg/100 ml, 10 to 30 mg/100 ml, 10 to 25 mg/100 ml, 10 to 20 mg/100 ml, 15 to 200 mg/100 ml, 15 to 190 mg/100 ml, 15 to 180 mg/100 ml, 15 to 170 mg/100 ml, 15 to 160 mg/100 ml, 15 to 150 mg/100 ml, 15 to 140 mg/100 ml, 15 to 130 mg/100 ml, 15 to 120 mg/100 ml, 15 to 110 mg/100 ml, 15 to 10 mg/100 ml, 15 to 90 mg/100 ml, 15 to 80 mg/100 ml, 15 to 70 mg/100 ml, 15 to 60 mg/100 ml, 15 to 55 mg/100 ml, 15 to 50 mg/100 ml, 15 to 45 mg/100 ml, 15 to 40 mg/100 ml, 15 to 35 mg/100 ml, 15 to 30 mg/100 ml, 15 to 25 mg/100 ml, 15 to 20 mg/100 ml, 20 to 200 mg/100 ml, 20 to 190 mg/100 ml, 20 to 180 mg/100 ml, 20 to 170 mg/100 ml, 20 to 160 mg/100 ml, 20 to 150 mg/100 ml, 20 to 140 mg/100 ml, 20 to 130 mg/100 ml, 20 to 120 mg/100 ml, 20 to 110 mg/100 ml, 20 to 100 mg/100 ml, 20 to 90 mg/100 ml, 20 to 80 mg/100 ml, 20 to 70 mg/100 ml, 20 to 60 mg/100 ml, 20 to 55 mg/100 ml, 20 to 50 mg/100 ml, 20 to 45 mg/100 ml, 20 to 40 mg/100 ml, 20 to 35 mg/100 ml, 20 to 30 mg/100 ml, 20 to 25 mg/100 ml, 25 to 200 mg/100 ml, 25 to 190 mg/100 ml, 25 to 180 mg/100 ml, 25 to 170 mg/100 ml, 25 to 160 mg/100 ml, 25 to 150 mg/100 ml, 25 to 140 mg/100 ml, 25 to 130 mg/100 ml, 25 to 120 mg/100 ml, 25 to 110 mg/100 ml, 25 to 100 mg/100 ml, 25 to 90 mg/100 ml, 25 to 80 mg/100 ml, 25 to 70 mg/100 ml, 25 to 60 mg/100 ml, 25 to 55 mg/100 ml, 25 to 50 mg/100 ml, 25 to 45 mg/100 ml, 25 to 40 mg/100 ml, 25 to 35 mg/100 ml, 25 to 30 mg/100 ml, 30 to 200 mg/100 ml, 30 to 190 mg/100 ml, 30 to 180 mg/100 ml, 30 to 170 mg/100 ml, 30 to 160 mg/100 ml, 30 to 150 mg/100 ml, 30 to 140 mg/100 ml, 30 to 130 mg/100 ml, 30 to 120 mg/100 ml, 30 to 110 mg/100 ml, 30 to 100 mg/100 ml, 30 to 90 mg/100 ml, 30 to 80 mg/100 ml, 30 to 70 mg/100 ml, 30 to 60 mg/100 ml, 30 to 55 mg/100 ml, 30 to 50 mg/100 ml, 30 to 45 mg/100 ml, 35 to 200 mg/100 ml, 35 to 190 mg/100 ml, 35 to 180 mg/100 ml, 35 to 170 mg/100 ml, 35 to 160 mg/100 ml, 35 to 150 mg/100 ml, 35 to 140 mg/100 ml, 35 to 130 mg/100 ml, 35 to 120 mg/100 ml, 35 to 110 mg/100 ml, 35 to 100 mg/100 ml, 35 to 90 mg/100 ml, 35 to 80 mg/100 ml, 35 to 70 mg/100 ml, 35 to 60 mg/100 ml, 35 to 55 mg/100 ml, 35 to 50 mg/100 ml, 40 to 200 mg/100 ml, 40 to 190 mg/100 ml, 40 to 180 mg/100 ml, 40 to 170 mg/100 ml, 40 to 160 mg/100 ml, 40 to 150 mg/100 ml, 40 to 140 mg/100 ml, 40 to 130 mg/100 ml, 40 to 120 mg/100 ml, 40 to 110 mg/100 ml, 40 to 100 mg/100 ml, 40 to 90 mg/100 ml, 40 to 80 mg/100 ml, 40 to 70 mg/100 ml, 40 to 60 mg/100 ml, 40 to 55 mg/100 ml, 50 to 130 mg/100 ml, 50 to 120 mg/100 ml, 50 to 110 mg/100 ml, 50 to 100 mg/100 ml, 50 to 90 mg/100 ml, 50 to 80 mg/100 ml, 50 to 70 mg/100 ml, 60 to 130 mg/100 ml, 60 to 120 mg/100 ml, 60 to 110 mg/100 ml, 60 to 100 mg/100 ml, 60 to 90 mg/100 ml, 60 to 80 mg/100 ml, 70 to 130 mg/100 ml, 70 to 120 mg/100 ml, 70 to 110 mg/100 ml, 70 to 100 mg/100 ml, 70 to 90 mg/100 ml, 80 to 130 mg/100 ml, 80 to 120 mg/100 ml, 80 to 110 mg/100 ml, 80 to 100 mg/100 ml, 90 to 130 mg/100 ml, 90 to 120 mg/100 ml or 90 to 110 mg/100 ml.

The form of sodium is not particularly limited as long as it is contained in an ingestible state in the alcoholic beverage of the present invention, and may be, for example, at least one form selected from the group consisting of sodium chloride, sodium hydroxide, sodium malate, sodium sulfate, sodium citrate, sodium phosphate, sodium carbonate, sodium disulfide, sodium bicarbonate, sodium alginate, sodium arginate, sodium glucoheptanoate, sodium gluconate, sodium glutamate, sodium tartrate, sodium aspartate, sodium lactate, casein sodium, sodium ascorbate and a mixture thereof. When sodium in any of these forms is contained in the alcoholic beverage according to an embodiment of the present invention, sodium may be dissociated into sodium ions. Since sodium may be contained in water or a flavor of an alcoholic beverage, sodium contained in such a raw material is also included in sodium contained in the alcoholic beverage of the present invention. When the alcoholic beverage contains milk contents such as milk, cow milk and dairy products, sodium contained in the milk contents is also included. In an embodiment of the present invention, sodium derived from a sodium component used as a preservative (e.g. sodium benzoate, sodium sulfite, sodium hyposulfite, sodium dehydroacetate, sodium pyrosulfite or sodium propionate) is excluded from the sodium content in the alcoholic beverage of the present invention.

The alcoholic beverage in an embodiment of the present invention may be one obtained by adding the various forms of raw materials such as sodium chloride so as to ensure that the sodium amount is a predetermined amount per 100 ml of a final product. For example, the alcoholic beverage may be one obtained by adding the various forms of raw materials such as sodium chloride in production of the alcoholic beverage so as to ensure that the sodium amount is more than 0 mg and 250 mg or less, 5 to 200 mg, 10 to 200 mg, 10 to 190 mg, 10 to 180 mg, 10 to 170 mg, 10 to 160 mg, 10 to 150 mg, 10 to 140 mg, 10 to 130 mg, 10 to 120 mg, 10 to 110 mg, 10 to 100 mg, 10 to 90 mg, 10 to 80 mg, 10 to 70 mg, 1060 mg, 10 to 55 mg, 10 to 50 mg, 10 to 45 mg, 10 to 40 mg, 10 to 35 mg, 10 to 30 mg, 10 to 25 mg, 10 to 20 mg, 15 to 200 mg, 15 to 190 mg, 15 to 180 mg, 15 to 170 mg, 15 to 160 mg, 15 to 150 mg, 15 to 140 mg, 15 to 130 mg, 15 to 120 mg, 15 to 110 mg, 15 to 100 mg, 15 to 90 mg, 15 to 80 mg, 15 to 70 mg, 15 to 60 mg, 15 to 55 mg, 15 to 50 mg, 15 to 45 mg, 15 to 40 mg, 15 to 35 mg, 15 to 30 mg, 15 to 25 mg, 15 to 20 mg, 20 to 200 mg, 20 to 190 mg, 20 to 180 mg, 20 to 170 mg, 20 to 160 mg, 20 to 150 mg, 20 to 140 mg, 20 to 130 mg, 20 to 120 mg, 20 to 110 mg, 20 to 100 mg, 20 to 90 mg, 20 to 80 mg, 20 to 70 mg, 20 to 60 mg, 20 to 55 mg, 20 to 50 mg, 20 to 45 mg, 20 to 40 mg, 20 to 35 mg, 20 to 30 mg, 20 to 25 mg, 25 to 200 mg, 25 to 190 mg, 25 to 180 mg, 25 to 170 mg, 25 to 160 mg, 25 to 150 mg, 25 to 140 mg, 25 to 130 mg, 25 to 120 mg, 25 to 110 mg, 25 to 100 mg, 25 to 90 mg, 25 to 80 mg, 25 to 70 mg, 25 to 60 mg, 25 to 55 mg, 25 to 50 mg, 25 to 45 mg, 25 to 40 mg, 25 to 35 mg, 25 to 30 mg, 30 to 200 mg, 30 to 190 mg, 30 to 180 mg, 30 to 170 mg, 30 to 160 mg, 30 to 150 mg, 30 to 140 mg, 30 to 130 mg, 30 to 120 mg, 30 to 110 mg, 30 to 100 mg, 30 to 90 mg, 30 to 80 mg, 30 to 70 mg, 30 to 60 mg, 30 to 55 mg, 30 to 50 mg, 30 to 45 mg, 35 to 200 mg, 35 to 190 mg, 35 to 180 mg, 35 to 170 mg, 35 to 160 mg, 35 to 150 mg, 35 to 140 mg, 35 to 130 mg, 35 to 120 mg, 35 to 110 mg, 35 to 100 mg, 35 to 90 mg, 35 to 80 mg, 35 to 70 mg, 35 to 60 mg, 35 to 55 mg, 35 to 50 mg, 40 to 200 mg, 40 to 190 mg, 40 to 180 mg, 40 to 170 mg, 40 to 160 mg, 40 to 150 mg, 40 to 140 mg, 40 to 130 mg, 40 to 120 mg, 40 to 110 mg, 40 to 100 mg, 40 to 90 mg, 40 to 80 mg, 40 to 70 mg, 40 to 60 mg, 40 to 55 mg, 50 to 130 mg, 50 to 120 mg, 50 to 110 mg, 50 to 100 mg, 50 to 90 mg, 50 to 80 mg, 50 to 70 mg, 60 to 130 mg, 60 to 120 mg, 60 to 110 mg, 60 to 100 mg, 60 to 90 mg, 60 to 80 mg, 70 to 130 mg, 70 to 120 mg, 70 to 110 mg, 70 to 100 mg, 70 to 90 mg, 80 to 130 mg, 80 to 120 mg, 80 to 110 mg, 80 to 100 mg, 90 to 130 mg, 90 to 120 mg or 90 to 110 mg per 100 ml of a final product.

Herein, the amount of sodium in the beverage can be measured by an atomic absorption method. When the blending amount of a sodium-containing compound blended in the beverage is known, a value calculated from the blending amount may be used.

<Potassium>

The alcoholic beverage in an embodiment of the present invention may contain potassium. The alcoholic beverage in an embodiment of the present invention may contain the above-described sodium in addition to potassium. Herein, the phrase "the content of potassium in the alcoholic beverage is 5 to 300 mg/100 ml" means that the content of potassium atoms is 5 to 300 mg/100 ml. Depending on an embodiment, the content of potassium may be more than 0 mg/100 ml and 300 mg/100 ml or less, 5 to 300 mg/100 ml, 5 to 250 mg/100 ml, 5 to 200 mg/100 ml, 10 to 300 mg/100 ml, 10 to 250 mg/100 ml, 10 to 200 mg/100 ml, 10 to 190 mg/100 ml, 10 to 180 mg/100 ml, 10 to 170 mg/100 ml, 10 to 160 mg/100 ml, 10 to 150 mg/100 ml, 10 to 140 mg/100 ml, 10 to 130 mg/100 ml, 10 to 120 mg/100 ml, 10 to 110 mg/100 ml, 10 to 100 mg/100 ml, 10 to 90 mg/100 ml, 10 to 80 mg/100 ml, 10 to 70 mg/100 ml, 10 to 60 mg/100 ml, 10 to 55 mg/100 ml, 10 to 50 mg/100 ml, 10 to 45 mg/100 ml, 10 to 40 mg/100 ml, 10 to 35 mg/100 ml, 10 to 30 mg/100 ml, 10 to 25 mg/100 ml, 10 to 20 mg/100 ml, 15 to 300 mg/100 ml, 15 to 250 mg/100 ml, 15 to 200 mg/100 ml, 15 to 190 mg/100 ml, 15 to 180 mg/100 ml, 15 to 170 mg/100 ml, 15 to 160 mg/100 ml, 15 to 150 mg/100 ml, 15 to 140 mg/100 ml, 15 to 130 mg/100 ml, 15 to 120 mg/100 ml, 15 to 110 mg/100 ml, 15 to 100 mg/100 ml, 15 to 90 mg/100 ml, 15 to 80 mg/100 ml, 15 to 70 mg/100 ml, 15 to 60 mg/100 ml, 15 to 55 mg/100 ml, 15 to 50 mg/100 ml, 15 to 45 mg/100 ml, 15 to 40 mg/100 ml, 15 to 35 mg/100 ml, 15 to 30 mg/100 ml, 15 to 25 mg/100 ml, 15 to 20 mg/100 ml, 20 to 300 mg/100 ml, 20 to 250 mg/100 ml, 20 to 200 mg/100 ml, 20 to 190 mg/100 ml, 20 to 180 mg/100 ml, 20 to 170 mg/100 ml, 20 to 160 mg/100 ml, 20 to 150 mg/100 ml, 20 to 140 mg/100 ml, 20 to 130 mg/100 ml, 20 to 120 mg/100 ml, 20 to 110 mg/100 ml, 20 to 100 mg/100 ml, 20 to 90 mg/100 ml, 20 to 80 mg/100 ml, 20 to 70 mg/100 ml, 20 to 60 mg/100 ml, 20 to 55 mg/100 ml, 20 to 50 mg/100 ml, 20 to 45 mg/100 ml, 20 to 40 mg/100 ml, 20 to 35 mg/100 ml, 20 to 30 mg/100 ml, 20 to 25 mg/100 ml, 25 to 300 mg/100 ml, 25 to 250 mg/100 ml, 25 to 200 mg/100 ml, 25 to 190 mg/100 ml, 25 to 180 mg/100 ml, 25 to 170 mg/100 ml, 25 to 160 mg/100 ml, 25 to 150 mg/100 ml, 25 to 140 mg/100 ml, 25 to 130 mg/100 ml, 25 to 120 mg/100 ml, 25 to 110 mg/100 ml, 25 to 100 mg/100 ml, 25 to 90 mg/100 ml, 25 to 80 mg/100 ml, 25 to 70 mg/100 ml, 25 to 60 mg/100 ml, 25 to 55 mg/100 ml, 25 to 50 mg/100 ml, 25 to 45 mg/100 ml, 25 to 40 mg/100 ml, 25 to 35 mg/100 ml, 25 to 30 mg/100 ml, 30 to 300 mg/100 ml, 30 to 250 mg/100 ml, 30 to 200 mg/100 ml, 30 to 190 mg/100 ml, 30 to 180 mg/100 ml, 30 to 170 mg/100 ml, 30 to 160 mg/100 ml, 30 to 150 mg/100 ml, 30 to 140 mg/100 ml, 30 to 130 mg/100 ml, 30 to 120 mg/100 ml, 30 to 110 mg/100 ml, 30 to 100 mg/100 ml, 30 to 90 mg/100 ml, 30 to 80 mg/100 ml, 30 to 70 mg/100 ml, 30 to 60 mg/100 ml, 30 to 55 mg/100 ml, 30 to 50 mg/100 ml, 30 to 45 mg/100 ml, 35 to 300 mg/100 ml, 35 to 250 mg/100 ml, 35 to 200 mg/100 ml, 35 to 190 mg/100 ml, 35 to 180 mg/100 ml, 35 to 170 mg/100 ml, 35 to 160 mg/100 ml, 35 to 150 mg/100 ml, 35 to 140 mg/100 ml, 35 to 130 mg/100 ml, 35 to 120 mg/100 ml, 35 to 110 mg/100 ml, 35 to 100 mg/100 ml, 35 to 90 mg/100 ml, 35 to 80 mg/100 ml, 35 to 70 mg/100 ml, 35 to 60 mg/100 ml, 35 to 55 mg/100 ml, 35 to 50 mg/100 ml, 40 to 300 mg/100 ml, 40 to 250 mg/100 ml, 40 to 200 mg/100 ml, 40 to 190 mg/100 ml, 40 to 180 mg/100 ml, 40 to 170 mg/100 ml, 40 to 160 mg/100 ml, 40 to 150 mg/100 ml, 40 to 140 mg/100 ml, 40 to 130 mg/100 ml, 40 to 120 mg/100 ml, 40 to 110 mg/100 ml, 40 to 100 mg/100 ml, 40 to 90 mg/100 ml, 40 to 80 mg/100 ml, 40 to 70 mg/100 ml, 40 to 60 mg/100 ml, 40 to 55 mg/100 ml, 50 to 300 mg/100 ml, 50 to 250 mg/100 ml, 50 to 200 mg/100 ml, 50 to 150 mg/100 ml, 50 to 130 mg/100 ml, 50 to 120 mg/100 ml, 50 to 110 mg/100 ml, 50 to 100 mg/100 ml, 50 to 90 mg/100 ml, 50 to 80 mg/100 ml, 50 to 70 mg/100 ml, 60 to 300 mg/100 ml, 60 to 250 mg/100 ml, 60 to 200 mg/100 ml, 60 to 150 mg/100 ml, 60 to 130 mg/100 ml, 60 to 120 mg/100 ml, 60 to 110 mg/100 ml, 60 to 100 mg/100 ml, 60 to 90 mg/100 ml, 60 to 80 mg/100 ml, 70 to 300 mg/100 ml, 70 to 250 mg/100 ml, 70 to 200 mg/100 ml, 70 to 150 mg/100 ml, 70 to 130 mg/100 ml, 70 to 120 mg/100 ml, 70 to 110 mg/100 ml, 70 to 100 mg/100 ml, 70 to 90 mg/100 ml, 80 to 300 mg/100 ml, 80 to 250 mg/100 ml, 80 to 200 mg/100 ml, 80 to 150 mg/100 ml, 80 to 130 mg/100 ml, 80 to 120 mg/100 ml, 80 to 110 mg/100 ml, 80 to 100 mg/100 ml, 90 to 300 mg/100 ml, 90 to 250 mg/100 ml, 90 to 200 mg/100 ml, 90 to 150 mg/100 ml, 90 to 130 mg/100 ml, 90 to 120 mg/100 ml or 90 to 110 mg/100 ml.

The form of potassium is not particularly limited as long as it is contained in an ingestible state in the alcoholic beverage of the present invention, and may be, for example, at least one form selected from the group consisting of potassium alginate, potassium chloride, potassium citrate, potassium gluconate, potassium L-glutamate, potassium bromate, potassium hydrogen DL-tartrate, L-potassium hydrogen L-tartrate, potassium nitrate, potassium hydroxide, potassium sorbate, potassium carbonate, potassium lactate, potassium norbixin, potassium pyrosulfite, tetrapotassium pyrophosphate, potassium ferrocyanide, potassium polyphosphate, potassium metaphosphate, potassium aluminum sulfate, potassium sulfate, tripotassium phosphate, dipotassium hydrogen phosphate, potassium dihydrogen phosphate and a mixture thereof. When potassium in any of these forms is contained in the alcoholic beverage according to an embodiment of the present invention, potassium may be dissociated into potassium ions.

Since potassium may be contained in water or a flavor of a sparkling beverage, potassium contained in such a raw material is also included in potassium contained in the sparkling beverage according to the present invention. When the sparkling beverage contains milk contents such as milk, cow milk and dairy products, potassium contained in the milk contents is also included.

The alcoholic beverage in an embodiment of the present invention may be one obtained by adding the various forms of raw materials such as potassium chloride so as to ensure that the potassium amount is a predetermined amount per 100 ml of a final product. For example, the alcoholic beverage may be one obtained by adding the various forms of raw materials such as potassium chloride in production of the alcoholic beverage so as to ensure that the potassium amount is more than 0 mg and 300 mg or less, 5 to 300 mg, 5 to 250 mg, 5 to 200 mg, 10 to 300 mg, 10 to 250 mg, 10 to 200 mg, 10 to 190 mg, 10 to 180 mg, 10 to 170 mg, 10 to 160 mg, 10 to 150 mg, 10 to 140 mg, 10 to 130 mg, 10 to 120 mg, 10 to 110 mg, 10 to 100 mg, 10 to 90 mg, 10 to 80 mg, 10 to 70 mg, 10 to 60 mg, 10 to 55 mg, 10 to 50 mg, 10 to 45 mg, 10 to 40 mg, 10 to 35 mg, 10 to 30 mg, 10 to 25 mg, 10 to 20 mg, 15 to 300 mg, 15 to 250 mg, 15 to 200 mg, 15 to 190 mg, 15 to 180 mg, 15 to 170 mg, 15 to 160 mg, 15 to 150 mg, 15 to 140 mg, 15 to 130 mg, 15 to 120 mg, 15 to 110 mg, 15 to 100 mg, 15 to 90 mg, 15 to 80 mg, 15 to 70 mg, 15 to 60 mg, 15 to 55 mg, 15 to 50 mg, 15 to 45 mg, 15 to 40 mg, 15 to 35 mg, 15 to 30 mg, 15 to 25 mg, 15 to 20 mg, 20 to 300 mg, 20 to 250 mg, 20 to 200 mg, 20 to 190 mg, 20 to 180 mg, 20 to 170 mg, 20 to 160 mg, 20 to 150 mg, 20 to 140 mg, 20 to 130 mg, 20 to 120 mg, 20 to 110 mg, 20 to 100 mg, 20 to 90 mg, 20 to 80 mg, 20 to 70 mg, 20 to 60 mg, 20 to 55 mg, 20 to 50 mg, 20 to 45 mg, 20 to 40 mg, 20 to 35 mg, 20 to 30 mg, 20 to 25 mg, 25 to 300 mg, 25 to 250 mg, 25 to 200 mg, 25 to 190 mg, 25 to 180 mg, 25 to 170 mg, 25 to 160 mg, 25 to 150 mg, 25 to 140 mg, 25 to 130 mg, 25 to 120 mg, 25 to 110 mg, 25 to 100 mg, 25 to 90 mg, 25 to 80 mg, 25 to 70 mg, 25 to 60 mg, 25 to 55 mg, 25 to 50 mg, 25 to 45 mg, 25 to 40 mg, 25 to 35 mg, 25 to 30 mg, 30 to 300 mg, 30 to 250 mg, 30 to 200 mg, 30 to 190 mg, 30 to 180 mg, 30 to 170 mg, 30 to 160 mg, 30 to 150 mg, 30 to 140 mg, 30 to 130 mg, 30 to 120 mg, 30 to 110 mg, 30 to 100 mg, 30 to 90 mg, 30 to 80 mg, 30 to 70 mg, 30 to 60 mg, 30 to 55 mg, 30 to 50 mg, 30 to 45 mg, 35 to 300 mg, 35 to 250 mg, 35 to 200 mg, 35 to 190 mg, 35 to 180 mg, 35 to 170 mg, 35 to 160 mg, 35 to 150 mg, 35 to 140 mg, 35 to 130 mg, 35 to 120 mg, 35 to 110 mg, 35 to 100 mg, 35 to 90 mg, 35 to 80 mg, 35 to 70 mg, 35 to 60 mg, 35 to 55 mg, 35 to 50 mg, 40 to 300 mg, 40 to 250 mg, 40 to 200 mg, 40 to 190 mg, 40 to 180 mg, 40 to 170 mg, 40 to 160 mg, 40 to 150 mg, 40 to 140 mg, 40 to 130 mg, 40 to 120 mg, 40 to 110 mg, 40 to 100 mg, 40 to 90 mg, 40 to 80 mg, 40 to 70 mg, 40 to 60 mg, 40 to 55 mg, 50 to 300 mg, 50 to 250 mg, 50 to 200 mg, 50 to 150 mg, 50 to 130 mg, 50 to 120 mg, 50 to 110 mg, 50 to 100 mg, 50 to 90 mg, 50 to 80 mg, 50 to 70 mg, 60 to 300 mg, 60 to 250 mg, 60 to 200 mg, 60 to 150 mg, 60 to 130 mg, 60 to 120 mg, 60 to 110 mg, 60 to 100 mg, 60 to 90 mg, 60 to 80 mg, 70 to 300 mg, 70 to 250 mg, 70 to 200 mg, 70 to 150 mg, 70 to 130 mg, 70 to 120 mg, 70 to 110 mg, 70 to 100 mg, 70 to 90 mg, 80 to 300 mg, 80 to 250 mg, 80 to 200 mg, 80 to 150 mg, 80 to 130 mg, 80 to 120 mg, 80 to 110 mg, 80 to 100 mg, 90 to 300 mg, 90 to 250 mg, 90 to 200 mg, 90 to 150 mg, 90 to 130 mg, 90 to 120 mg or 90 to 110 mg per 100 ml of a final product.

Herein, the content of potassium in the beverage can be measured by an atomic absorption method. When the blending amount of a potassium-containing compound blended in the beverage is known, a value calculated from the blending amount may be used.

The pH of the alcoholic beverage of the present invention is not particularly limited, and may be, for example, 2.0 to 6.5. For example, the pH of the alcoholic beverage according to an embodiment of the present invention may be 3.0 to 4.5, 2.6 to 3.9, 2.7 to 3.8, 2.8 to 3.7, 2.9 to 3.6 or 3.0 to 3.5.

Antioxidants (e.g. sodium erythorbate), emulsifiers (e.g. sucrose fatty acid esters, sorbitan fatty acid esters and polyglycerin fatty acid esters), flavors and the like can be appropriately blended into the alcoholic beverage of the present invention as long as the effects of the present invention are not impaired.

[Exemplary Embodiment of Alcoholic Beverage of Invention]

An embodiment of the present invention provides an alcoholic beverage containing rebaudioside D,
wherein the content of the rebaudioside D is preferably 0.01 to 0.5 g/1000 ml, more preferably 0.02 to 0.5 g/1000 ml, still more preferably 0.06 to 0.5 g/1000 ml, and
the alcohol content is preferably 3.0 to 15.0 v/v %, more preferably 5.0 to 12.0 v/v %, still more preferably 6.0 to 10.0 v/v %.

An embodiment of the present invention provides an alcoholic beverage containing rebaudioside M,
wherein the content of the rebaudioside M is preferably 0.01 to 0.5 g/1000 ml, more preferably 0.02 to 0.5 g/1000 ml, still more preferably 0.06 to 0.5 g/1000 ml, and
the alcohol content is preferably 3.0 to 15.0 v/v %, more preferably 5.0 to 12.0 v/v %, still more preferably 6.0 to 10.0 v/v %.

An embodiment of the present invention provides an alcoholic beverage containing rebaudioside D and rebaudioside M,
wherein the total content of the rebaudioside D and rebaudioside M is preferably 0.01 to 0.5 g/1000 ml, more preferably 0.02 to 0.5 g/1000 ml, still more preferably 0.06 to 0.5 g/1000 ml, and
the alcohol content is preferably 3.0 to 15.0 v/v %, more preferably 5.0 to 12.0 v/v %, still more preferably 6.0 to 10.0 v/v %.

An embodiment of the present invention provides an alcoholic beverage containing one or more steviol glycosides selected from rebaudioside D and rebaudioside M,
wherein the content of the steviol glycosides is preferably 0.01 to 0.5 g/1000 ml, more preferably 0.02 to 0.5 g/1000 ml, still more preferably 0.06 to 0.5 g/1000 ml,
the alcohol content is 0.5 to 40.0 v/v %, preferably 3.0 to 15.0 v/v %, more preferably 5.0 to 12.0 v/v %, still more preferably 6.0 to 10.0 v/v %, or 18.0 to 40.0 v/v % or 20.0 to 35.0 v/v %, and
the alcoholic beverage contains sodium at preferably 10 to 200 mg/100 ml, more preferably 10 to 150 mg/100 ml, still more preferably 10 to 110 mg/100 ml.

An embodiment of the present invention provides an alcoholic beverage containing one or more steviol glycosides selected from rebaudioside D and rebaudioside M,
wherein the content of the steviol glycosides is preferably 0.01 to 0.5 g/1000 ml, more preferably 0.02 to 0.5 g/1000 ml, still more preferably 0.06 to 0.5 g/1000 ml,
the alcohol content is 0.5 to 40.0 v/v %, preferably 3.0 to 15.0 v/v %, more preferably 5.0 to 12.0 v/v %, still more preferably 6.0 to 10.0 v/v %, or 18.0 to 40.0 v/v % or 20.0 to 35.0 v/v %, and
the alcoholic beverage contains a low-intensity sweetener, preferably a low-intensity sweetener selected from sugar (sucrose) and high-fructose corn syrup.

An embodiment of the present invention provides an alcoholic beverage containing one or more steviol glycosides selected from rebaudioside D and rebaudioside M,
wherein the content of the steviol glycosides is preferably 0.01 to 0.5 g/1000 ml, more preferably 0.02 to 0.5 g/1000 ml, still more preferably 0.06 to 0.5 g/1000 ml,
the alcohol content is 0.5 to 40.0 v/v %, preferably 3.0 to 15.0 v/v %, more preferably 5.0 to 12.0 v/v %, still more preferably 6.0 to 10.0 v/v %, or 18.0 to 40.0 v/v % or 20.0 to 35.0 v/v %, and
the sweetness intensity is preferably 0.1 to 20, more preferably 0.1 to 18, still more preferably 0.1 to 15.

An embodiment of the present invention provides an alcoholic beverage containing one or more steviol glycosides selected from rebaudioside D and rebaudioside M,
wherein the content of the steviol glycosides is preferably 0.01 to 0.5 g/1000 ml, more preferably 0.02 to 0.5 g/1000 ml, still more preferably 0.06 to 0.5 g/1000 ml,
the alcohol content is 0.5 to 40.0 v/v %, preferably 3.0 to 15.0 v/v %, more preferably 5.0 to 12.0 v/v %, still more preferably 6.0 to 10.0 v/v %, or 18.0 to 40.0 v/v % or 20.0 to 35.0 v/v %, and
the alcoholic beverage contains potassium at preferably 10 to 200 mg/100 ml, more preferably 10 to 150 mg/100 ml, still more preferably 10 to 110 mg/100 ml.

An embodiment of the present invention provides an alcoholic beverage containing one or more steviol glycosides selected from rebaudioside D and rebaudioside M, wherein the content of the steviol glycosides is preferably 0.01 to 0.5 g/1000 ml, more preferably 0.02 to 0.5 g/1000 ml, still more preferably 0.06 to 0.5 g/1000 ml,
the alcohol content is 0.5 to 40.0 v/v %, preferably 3.0 to 15.0 v/v %, more preferably 5.0 to 12.0 v/v %, still more preferably 6.0 to 10.0 v/v %, or 18.0 to 40.0 v/v % or 20.0 to 35.0 v/v %, and
the alcoholic beverage further contains a high-intensity sweetener other than rebaudioside D and rebaudioside M, for example, a peptide-based sweetener, a sucrose derivative or a synthetic sweetener, preferably one or more high-intensity sweeteners selected from acesulfame K and sucralose.

An embodiment of the present invention provides an alcoholic beverage containing one or more steviol glycosides selected from rebaudioside D and rebaudioside M,
wherein the content of the steviol glycosides is preferably 0.01 to 0.5 g/1000 ml, more preferably 0.02 to 0.5 g/1000 ml, still more preferably 0.06 to 0.5 g/1000 ml,
the alcohol content is 0.5 to 40.0 v/v %, preferably 3.0 to 15.0 v/v %, more preferably 5.0 to 12.0 v/v %, still more preferably 6.0 to 10.0 v/v %, or 18.0 to 40.0 v/v % or 20.0 to 35.0 v/v %, and
the alcoholic beverage further contains one or more high-intensity sweeteners selected from acesulfame K and sucralose, and the ratio of the total sweetness intensity of rebaudioside D and rebaudioside M to the total sweetness intensity is 25 to 95%, 30 to 95%, 40 to 95%, 50 to 95%, 60 to 95%, 70 to 95% or 80 to 95%.

2. Method for Producing Alcoholic Beverage

In another aspect, the present invention provides a method for producing the alcoholic beverage of the present invention (hereinafter, referred to as a "production method of the present invention"). The production method of the present invention is not particularly limited as long as alcoholic beverage is obtained which contains one or more steviol glycosides selected from rebaudioside D and rebaudioside M and in which the content of the steviol glycosides is 0.001 to 0.5 g/1000 ml and the alcohol content is 0.5 to 40.0 v/v %.

The production method according to an embodiment of the present invention comprises (a) adding one or more steviol glycosides selected from rebaudioside D and rebaudioside M, (b) adding an alcohol component (e.g. spirit), and (c) optionally, adding water or carbonated water. The addition of steviol glycosides in (a) is performed so as to ensure that the content of the steviol glycosides in the alcoholic beverage as a final product is 0.001 to 0.5 g/1000 ml. The addition of an alcohol component in (b) is performed so as to ensure that the alcohol content in the alcoholic beverage as a final product is 0.5 to 40.0 v/v %. The components may be added at the same time or otherwise. The alcohol component added in (b) above is not particularly limited, and any raw material can be used as long as it is a potable alcohol component such as spirit, liqueur, Japanese distilled spirit, whisky, brandy, material alcohol (e.g. neutral alcohol), plum wine, fruit wine or sweet fruit wine.

According to another embodiment of the present invention, one or more steviol glycosides selected from rebaudioside D and rebaudioside M may be added to a flavored liquor (e.g. plum wine) obtained by immersing a fruit such as plum in alcohol component, or wine or cider obtained by fermenting fruit juice, followed by dilution if necessary. Alternatively, a concentrated product described later may be diluted with water or carbonated water to produce the alcoholic beverage of the present invention.

In the production method according to an embodiment of the present invention, the definitions of "alcoholic beverage," "alcohol component," "steviol glycoside," "sweetness intensity," "optional other sweeteners," "acidic flavor substance," "sodium" and "potassium" are the same as described in the section of "alcoholic beverage" above, and for relevant numerical values, those described in the section of "alcoholic beverage" above hold exactly.

3. Concentrated Product for Providing Alcoholic Beverage

In another aspect, the present invention provides a concentrated product for providing the alcoholic beverage of the present invention (hereinafter, referred to a "concentrated product of the present invention"). According to an embodiment of the present invention, the concentrated product of the present invention is a 1.2 to 10 times concentrated product for providing the alcoholic beverage of the present invention, and may be, for example, a 1.2 to 9 times, 1.5 to 9 times, 1.8 to 9 times, 2 to 9 times, 2 to 8 times, 2 to 7 times, 2 to 6 times, 2 to 5 times, 2 to 4 times, 2 to 3 times, 3 to 10 times, 3 to 9 times, 3 to 8 times, 3 to 7 times, 3 to 6 times, 3 to 5 times, 3 to 4 times, 4 to 10 times, 4 to 9 times, 4 to 8 times, 4 to 7 times, 4 to 6 times, 4 to 5 times, 5 to 10 times, 5 to 9 times, 5 to 8 times, 5 to 7 times or 5 to 6 times concentrated product.

The concentrated product of the present invention is formed into the alcoholic beverage of the present invention when diluted by a predetermined factor. For example, the concentrated product of the present invention can be used as syrup or stock solution for a beverage. Here, the concentrated product can be diluted by a factor of 1.2, 1.5, 1.8, 2, 3, 4, 5, 6, 7, 8, 9 or 10, and used. Water or carbonated water can be used for the dilution. The concentrated product of the present invention is preferable in terms of preservability and transportability because of being concentrated. The concentrated product of the present invention may be solid or liquid.

The concentrated product according to an embodiment of the present invention may further contain sodium and/or potassium. The amount of sodium and/or potassium contained in the concentrated product according to an embodiment of the present invention can be adjusted by a concentration factor of the concentrated product. For example, when the concentrated product is a 1.2 to 10 times concentrated product for providing the alcoholic beverage of the present invention, the amount of sodium and/or potassium contained in the concentrated product can be 1.2 to 10 times the amount of sodium and/or potassium contained in the alcoholic beverage of the present invention.

The concentrated product according to an embodiment of the present invention contains one or more steviol glycosides selected from rebaudioside D and rebaudioside M. and alcohol. The concentrated product according to another embodiment of the present invention may further contain components described in "1. Alcoholic beverage containing steviol glycosides."

The concentrated product according to an embodiment of the present invention is a 2 times concentrated product of the alcoholic beverage of the present invention, and
  contains one or more steviol glycosides selected from rebaudioside D and rebaudioside M,
  wherein the content of the steviol glycosides is 0.002 to 1.0 g/1000 ml, and
  the alcohol content is 1.0 to 80.0 v/v %.

The concentrated product according to an embodiment of the present invention is a 4 times concentrated product of the alcoholic beverage of the present invention, and contains one or more steviol glycosides selected from rebaudioside D and rebaudioside M,
wherein the content of the steviol glycosides is 0.004 to 2.0 g/1000 ml, and
the alcohol content is 2.0 to 90.0 v/v %.

The concentrated product according to an embodiment of the present invention is a 6 times concentrated product of the alcoholic beverage of the present invention, and
contains one or more steviol glycosides selected from rebaudioside D and rebaudioside M,
wherein the content of the steviol glycosides is 0.006 to 3.0 g/1000 ml, and
the alcohol content is 3.0 to 90.0 v/v %.

In the concentrated product according to an embodiment of the present invention, the definitions of "alcoholic beverage," "alcohol component," "steviol glycoside," "sweetness intensity," "optional other sweeteners," "acidic flavor substance," "sodium" and "potassium" are the same as described in the section of "alcoholic beverage" above.

4. Method for Reducing Alcohol's Distinctive Pungency of Alcoholic Beverage

In another aspect, the present invention provides a method for reducing alcohol's distinctive pungency of an alcoholic beverage (hereinafter, referred to as a "pungency reduction method of the present invention"). According to an embodiment of the present invention, provided is a method for reducing alcohol's distinctive pungency of an alcoholic beverage, comprising adding one or more steviol glycosides selected from rebaudioside D and rebaudioside M at 0.001 to 0.5 g/1000 ml to an alcoholic beverage. According to an embodiment of the present invention, provided is a method for reducing alcohol's distinctive pungency of an alcoholic beverage, comprising adding one or more steviol glycosides selected from rebaudioside D and rebaudioside M at 0.001 to 0.5 g/1000 ml to an alcoholic beverage having an alcohol content of 0.5 to 40.0 v/v %.

In the pungency reduction method according to an embodiment of the present invention, one or more steviol glycosides selected from rebaudioside D and rebaudioside M at 0.001 to 0.5 g/1000 ml may be added to an alcoholic beverage, or alcohol may be added to a beverage containing the steviol glycoside to prepare an alcoholic beverage. One or more steviol glycosides selected from rebaudioside D and rebaudioside M at 0.001 to 0.5 g/1000 ml may be added to a beverage containing fruit juice or the like, followed by fermentation to obtain an alcoholic beverage.

In the pungency reduction method according to an embodiment of the present invention, sodium and/or potassium may be further added to an alcoholic beverage. In the pungency reduction method according to an embodiment of the present invention, various forms of raw materials such as sodium chloride or potassium chloride may be added so as to ensure that the amount of sodium and/or potassium added to the alcoholic beverage is more than 0 mg and 300 mg or less, 5 to 300 mg, 5 to 250 mg, 5 to 200 mg, 10 to 300 mg, 10 to 250 mg, 10 to 200 mg, 10 to 190 mg, 10 to 180 mg, 10 to 170 mg, 10 to 160 mg, 10 to 150 mg, 10 to 140 mg, 10 to 130 mg, 10 to 120 mg, 10 to 110 mg, 10 to 100 mg, 10 to 90 mg, 10 to 80 mg, 10 to 70 mg, 10 to 60 mg, 10 to 55 mg, 10 to 50 mg, 10 to 45 mg, 10 to 40 mg, 10 to 35 mg, 10 to 30 mg, 10 to 25 mg, 10 to 20 mg, 15 to 300 mg, 15 to 250 mg, 15 to 200 mg, 15 to 190 mg, 15 to 180 mg, 15 to 170 mg, 15 to 160 mg, 15 to 150 mg, 15 to 140 mg, 15 to 130 mg, 15 to 120 mg, 15 to 110 mg, 15 to 100 mg, 15 to 90 mg, 15 to 80 mg, 15 to 70 mg, 15 to 60 mg, 15 to 55 mg, 15 to 50 mg, 15 to 45 mg, 15 to 40 mg, 15 to 35 mg, 15 to 30 mg, 15 to 25 mg, 15 to 20 mg, 20 to 300 mg, 20 to 250 mg, 20 to 200 mg, 20 to 190 mg, 20 to 180 mg, 20 to 170 mg, 20 to 160 mg, 20 to 150 mg, 20 to 140 mg, 20 to 130 mg, 20 to 120 mg, 20 to 110 mg, 20 to 100 mg, 20 to 90 mg, 20 to 80 mg, 20 to 70 mg, 20 to 60 mg, 20 to 55 mg, 20 to 50 mg, 20 to 45 mg, 20 to 40 mg, 20 to 35 mg, 20 to 30 mg, 20 to 25 mg, 25 to 300 mg, 25 to 250 mg, 25 to 200 mg, 25 to 190 mg, 25 to 180 mg, 25 to 170 mg, 25 to 160 mg, 25 to 150 mg, 25 to 140 mg, 25 to 130 mg, 25 to 120 mg, 25 to 110 mg, 25 to 100 mg, 25 to 90 mg, 25 to 80 mg, 25 to 70 mg, 25 to 60 mg, 25 to 55 mg, 25 to 50 mg, 25 to 45 mg, 25 to 40 mg, 25 to 35 mg, 25 to 30 mg, 30 to 300 mg, 30 to 250 mg, 30 to 200 mg, 30 to 190 mg, 30 to 180 mg, 30 to 170 mg, 30 to 160 mg, 30 to 150 mg, 30 to 140 mg, 30 to 130 mg, 30 to 120 mg, 30 to 110 mg, 30 to 100 mg, 30 to 90 mg, 30 to 80 mg, 30 to 70 mg, 30 to 60 mg, 30 to 55 mg, 30 to 50 mg, 30 to 45 mg, 35 to 300 mg, 35 to 250 mg, 35 to 200 mg, 35 to 190 mg, 35 to 180 mg, 35 to 170 mg, 35 to 160 mg, 35 to 150 mg, 35 to 140 mg, 35 to 130 mg, 35 to 120 mg, 35 to 110 mg, 35 to 100 mg, 35 to 90 mg, 35 to 80 mg, 35 to 70 mg, 35 to 60 mg, 35 to 55 mg, 35 to 50 mg, 40 to 300 mg, 40 to 250 mg, 40 to 200 mg, 40 to 190 mg, 40 to 180 mg, 40 to 170 mg, 40 to 160 mg, 40 to 150 mg, 40 to 140 mg, 40 to 130 mg, 40 to 120 mg, 40 to 110 mg, 40 to 100 mg, 40 to 90 mg, 40 to 80 mg, 40 to 70 mg, 40 to 60 mg, 40 to 55 mg, 50 to 300 mg, 50 to 250 mg, 50 to 200 mg, 50 to 150 mg, 50 to 130 mg, 50 to 120 mg, 50 to 110 mg, 50 to 100 mg, 50 to 90 mg, 50 to 80 mg, 50 to 70 mg, 60 to 300 mg, 60 to 250 mg, 60 to 200 mg, 60 to 150 mg, 60 to 130 mg, 60 to 120 mg, 60 to 110 mg, 60 to 100 mg, 60 to 90 mg, 60 to 80 mg, 70 to 300 mg, 70 to 250 mg, 70 to 200 mg, 70 to 150 mg, 70 to 130 mg, 70 to 120 mg, 70 to 110 mg, 70 to 100 mg, 70 to 90 mg, 80 to 300 mg, 80 to 250 mg, 80 to 200 mg, 80 to 150 mg, 80 to 130 mg, 80 to 120 mg, 80 to 110 mg, 80 to 100 mg, 90 to 300 mg, 90 to 250 mg, 90 to 200 mg, 90 to 150 mg, 90 to 130 mg, 90 to 120 mg or 90 to 110 mg per 100 ml of a final product.

By the pungency reduction method according to an embodiment of the present invention, alcohol's distinctive pungency of an alcoholic beverage can be reduced to improve the quality of taste of the alcoholic beverage. In the pungency reduction method of the present invention, the definitions of "alcoholic beverage," "alcohol component," "steviol glycoside," "sweetness intensity," "optional other sweeteners," "acidic flavor substance," "sodium" and "potassium" are the same as described in the section of "alcoholic beverage" above, and for relevant numerical values, those described in the section of "alcoholic beverage" above hold exactly.

As used herein, the term "at least" means that the number of specific items may be equal to or greater than a number mentioned. Within the present application, the term "about" means that the subject is present within ±25%, ±10%, ±5%, ±3%, ±2% or ±1% of a numerical value following the term "about." For example, the term "about 10" means the range of 7.5 to 12.5.

EXAMPLES

Hereinafter, the present invention will be described in detail by way of Examples, which should not be construed as limiting the present invention.

[Example 1] Evaluation of Effect of RebD/RebM on Flavor of Alcoholic Beverage

<Preparation of Sample>

Neutral alcohol, a sweetener, an acidic flavor substance, water and carbon dioxide were mixed in blending amounts as shown in Tables 2 to 5, and a can container was filled with the mixture to prepare a sample liquid. The raw materials used are as follows: sugar: "Granulated Sugar GS" from Mitsui Sugar Co., Ltd., high-fructose corn syrup: "High Fructoca" from Kato Kagaku Co., Ltd., acesulfame K: "sunett" from Celanese Production Germany GmbH & Co. KG, sucralose: "Sucralose" from Tate & Lyle Japan KK., rebaudioside A: purity 95.0% or more, rebaudioside D: purity 90% or more, rebaudioside M: purity 96.6%, and citric acid anhydrous: "Citric Acid anhydrous" from Jungbunzlauer AG. After the raw materials for each sample were blended, carbon dioxide gas was injected to a gas pressure of about 1.7 kgf/cm$^2$ at a liquid temperature of 20° C.

<Evaluation on Reduction of Alcohol's Distinctive Pungency>

(Evaluation Method)

For "reduction of alcohol's distinctive pungency," three trained specialist panelists independently scored each of the thus-prepared samples on a five-point scale of scores 1 to 5 in accordance with the following evaluation criteria, and the average of the scores was calculated. Here, the term "reduction of alcohol's distinctive pungency" means that the acrid (e.g. pungent, burning or biting) taste derived from alcohol is reduced. A higher score means a higher reduction effect. Evaluation on reduction of alcohol's distinctive pungency was performed by swallowing the sample.

(Evaluation Criteria)
Score 5: Extremely strongly felt
Score 4: Strongly felt
Score 3: Felt
Score 2: Slightly felt
Score 1: Not felt <Evaluation on Sucrose-Like Natural Sweetness>

(Evaluation Method)

For "sucrose-like natural sweetness," three trained specialist panelists independently scored each of the thus-prepared samples on a five-point scale of scores 1 to 5 in accordance with the following evaluation criteria, and the average of the scores was calculated. A higher score means having sweetness closer to that of sucrose. Evaluation on sucrose-like natural sweetness was performed by swallowing the sample.

(Evaluation Criteria)
Score 5: Extremely strongly felt
Score 4: Strongly felt
Score 3: Felt
Score 2: Slightly felt
Score 1: Not felt <Evaluation on Quality in Aftertaste>

(Evaluation Method)

For "quality in aftertaste," three trained specialist panelists independently scored each of the thus-prepared samples on a five-point scale of scores 1 to 5 in accordance with the following evaluation criteria, and the average of the scores was calculated. Here, the term "quality in aftertaste" does not mean merely the aftertaste of a sweetener itself, but means total quality in aftertaste, including alcohol, acidic flavor substances and the like. A higher score means better aftertaste. Evaluation on quality in aftertaste was performed by swallowing the sample.

(Evaluation Criteria)
Score 5: Extremely strongly felt
Score 4: Strongly felt
Score 3: Felt
Score 2: Slightly felt
Score 1: Not felt <Overall Evaluation>

(Evaluation Method)

For "overall evaluation," three trained specialist panelists independently scored each of the thus-prepared samples on a five-point scale of scores 1 to 5 in accordance with the following evaluation criteria, and the average of the scores was calculated. Here, "overall evaluation" means overall evaluation of quality of taste as an alcoholic beverage (drink) based on evaluation on three key items: "reduction of alcohol's distinctive pungency," "natural sweetness" and "quality in aftertaste." Overall evaluation was performed by swallowing the sample.

Figure 2:
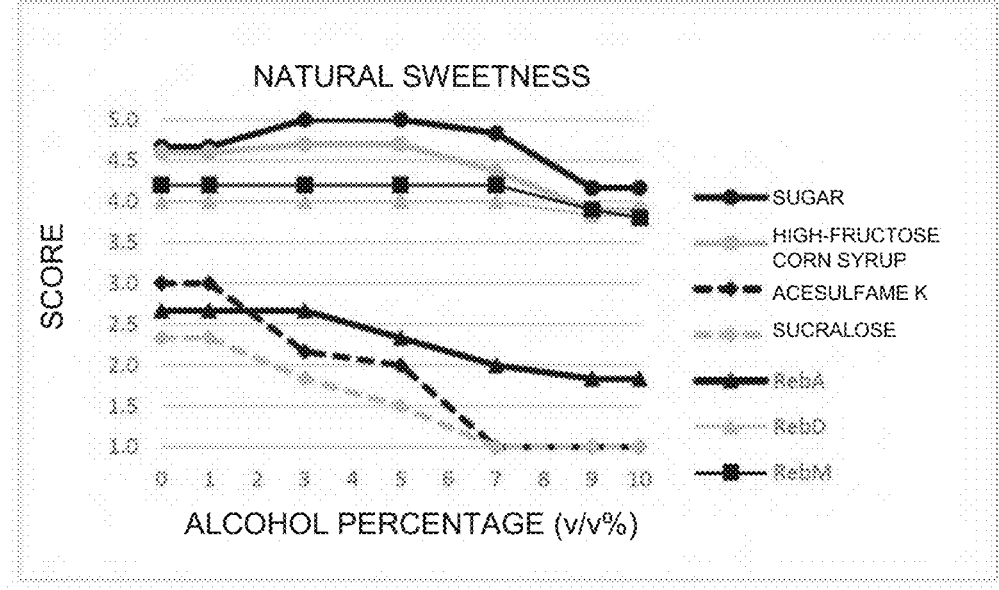
FIG. 2 is a graph showing the results of a sensory test for "natural sweetness" in Example 1.
Figure 3:
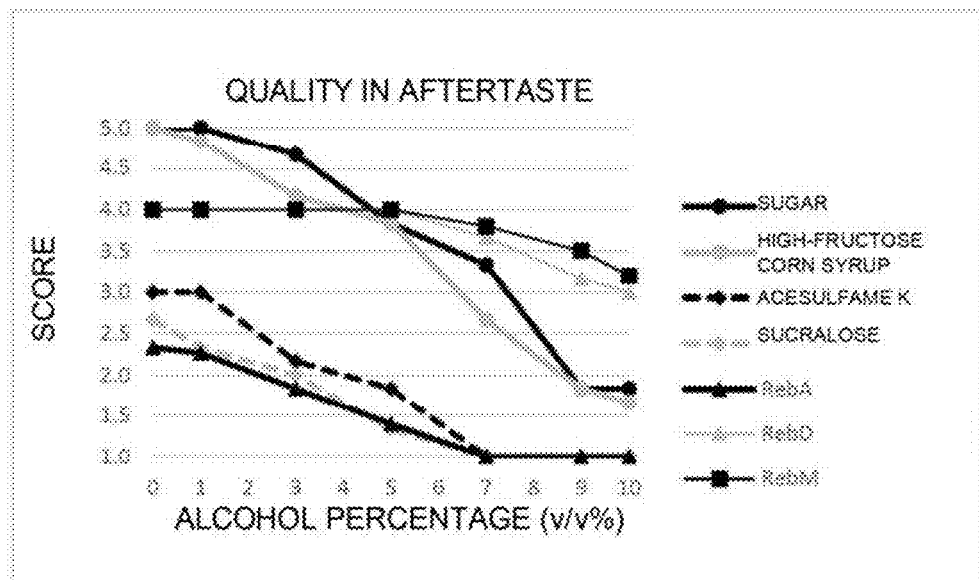
FIG. 3 is a graph showing the results of a sensory test for "quality in aftertaste" in Example 1.
Figure 4:
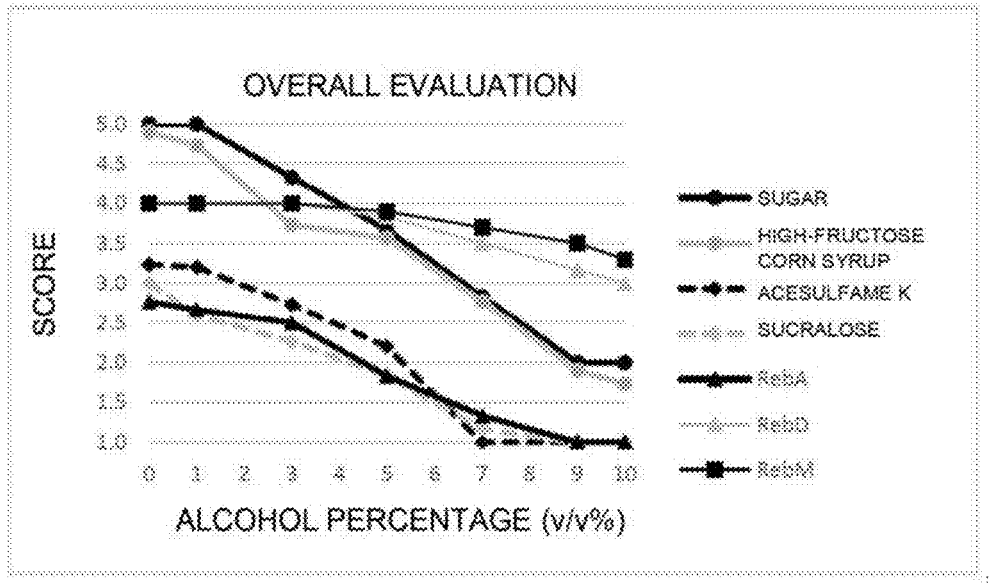
FIG. 4 is a graph showing the results of a sensory test for "overall evaluation" in Example 1.

(Evaluation Criteria)
Score 5: Excellent
Score 4: Very good
Score 3: Good
Score 2: Slightly good
Score 1: Not good Tables 2 to 5 and FIGS. 1 to 4 show the results of the sensory evaluations described above. The energy (kcal/100 ml) was calculated with acesulfame K, sucralose, rebaudioside A, rebaudioside D and rebaudioside M considered to have an energy of 0 (kcal/100 ml).

TABLE 2

| Sample No. | Unit | Sugar | | | | | | | High-fructose corn syrup | | | | | | |
| --- | --- | --- | --- | --- | --- | --- | --- | --- | --- | --- | --- | --- | --- | --- | --- |
| | | S-0 | S-1 | S-3 | S-5 | S-7 | S-9 | S-10 | B-0 | B-1 | B-3 | B-5 | B-7 | B-9 | B-10 |
| Neutral alcohol | ml/1000 ml | 0 | 17 | 51 | 85 | 119 | 153 | 170 | 0 | 17 | 51 | 85 | 119 | 153 | 170 |
| Citric acid anhydrous | g/1000 ml | 3.3 | 3.3 | 3.3 | 3.3 | 3.3 | 3.3 | 3.3 | 3.3 | 3.3 | 3.3 | 3.3 | 3.3 | 3.3 | 3.3 |
| Sugar | g/1000 ml | 15.0 | 15.0 | 15.0 | 15.0 | 15.0 | 15.0 | 15.0 | 0 | 0 | 0 | 0 | 0 | 0 | 0 |
| High-fructose corn syrup | g/1000 ml | 0 | 0 | 0 | 0 | 0 | 0 | 0 | 20.0 | 20.0 | 20.0 | 20.0 | 20.0 | 20.0 | 20.0 |
| Alcohol | v/v % | 0 | 1 | 3 | 5 | 7 | 9 | 10 | 0 | 1 | 3 | 5 | 7 | 9 | 10 |
| Sweetness intensity | — | 1.5 | 1.5 | 1.5 | 1.5 | 1.5 | 1.5 | 1.5 | 1.5 | 1.5 | 1.5 | 1.5 | 1.5 | 1.5 | 1.5 |
| Acidity | w/v % | 0.30 | 0.30 | 0.30 | 0.30 | 0.30 | 0.30 | 0.30 | 0.30 | 0.30 | 0.30 | 0.30 | 0.30 | 0.30 | 0.30 |
| Sweetness intensity/ acidity | — | 5.0 | 5.0 | 5.0 | 5.0 | 5.0 | 5.0 | 5.0 | 5.0 | 5.0 | 5.0 | 5.0 | 5.0 | 5.0 | 5.0 |

TABLE 2-continued

| Sample No. | Unit | Sugar | | | | | | | High-fructose corn syrup | | | | | | |
|---|---|---|---|---|---|---|---|---|---|---|---|---|---|---|---|
| | | S-0 | S-1 | S-3 | S-5 | S-7 | S-9 | S-10 | B-0 | B-1 | B-3 | B-5 | B-7 | B-9 | B-10 |
| Energy | kcal/100 ml | 7 | 13 | 24 | 35 | 46 | 57 | 63 | 7 | 13 | 24 | 35 | 46 | 57 | 63 |
| Reduction of alcohol's distinctive pungency | — | — | 2.0 | 2.7 | 3.0 | 3.0 | 2.0 | 2.0 | — | 1.9 | 2.6 | 2.9 | 2.9 | 1.7 | 1.7 |
| Natural sweetness | — | 4.7 | 4.7 | 5.0 | 5.0 | 4.8 | 4.2 | 4.2 | 4.6 | 4.6 | 4.7 | 4.7 | 4.4 | 3.9 | 3.9 |
| Quality in aftertaste | — | 5.0 | 5.0 | 4.7 | 3.8 | 3.3 | 1.8 | 1.8 | 5.0 | 4.8 | 4.2 | 3.8 | 2.7 | 1.8 | 1.7 |
| Overall evaluation | — | 5.0 | 5.0 | 4.3 | 3.7 | 2.8 | 2.0 | 2.0 | 4.9 | 4.7 | 3.7 | 3.6 | 2.8 | 1.9 | 1.7 |

TABLE 3

| Sample No. | | Acesulfame K | | | | | | |
|---|---|---|---|---|---|---|---|---|
| | | F-0 | F-1 | F-3 | F-5 | F-7 | F-9 | F-10 |
| Neutral alcohol | ml/1000 ml | 0 | 17 | 51 | 85 | 119 | 153 | 170 |
| Citric acid anhydrous | g/1000 ml | 3.3 | 3.3 | 3.3 | 3.3 | 3.3 | 3.3 | 3.3 |
| Acesulfame K | g/1000 ml | 0.075 | 0.075 | 0.075 | 0.075 | 0.075 | 0.075 | 0.075 |
| Sucralose | g/1000 ml | 0 | 0 | 0 | 0 | 0 | 0 | 0 |
| Alcohol | v/v % | 0 | 1 | 3 | 5 | 7 | 9 | 10 |
| Sweetness intensity | — | 1.5 | 1.5 | 1.5 | 1.5 | 1.5 | 1.5 | 1.5 |
| Acidity | w/v % | 0.30 | 0.30 | 0.30 | 0.30 | 0.30 | 0.30 | 0.30 |
| Sweetness intensity/acidity | — | 5.0 | 5.0 | 5.0 | 5.0 | 5.0 | 5.0 | 5.0 |
| Energy | kcal/100 ml | 1 | 7 | 18 | 29 | 40 | 51 | 57 |
| Reduction of alcohol's distinctive pungency | — | — | 1.0 | 1.2 | 1.0 | 1.0 | 1.0 | 1.0 |
| Natural sweetness | — | 3.0 | 3.0 | 2.2 | 2.0 | 1.0 | 1.0 | 1.0 |
| Quality in aftertaste | — | 3.0 | 3.0 | 2.2 | 1.8 | 1.0 | 1.0 | 1.0 |
| Overall evaluation | — | 3.2 | 3.2 | 2.7 | 2.2 | 1.0 | 1.0 | 1.0 |

| Sample No. | Sucralose | | | | | | |
|---|---|---|---|---|---|---|---|
| | G-0 | G-1 | G-3 | G-5 | G-7 | G-9 | G-10 |
| Neutral alcohol | 0 | 17 | 51 | 85 | 119 | 153 | 170 |
| Citric acid anhydrous | 3.3 | 3.3 | 3.3 | 3.3 | 3.3 | 3.3 | 3.3 |
| Acesulfame K | 0 | 0 | 0 | 0 | 0 | 0 | 0 |
| Sucralose | 0.025 | 0.025 | 0.02.5 | 0.025 | 0.025 | 0.025 | 0.02.5 |
| Alcohol | 0 | 1 | 3 | 5 | 7 | 9 | 10 |
| Sweetness intensity | 1.5 | 1.5 | 1.5 | 1.5 | 1.5 | 1.5 | 1.5 |
| Acidity | 0.30 | 0.30 | 0.30 | 0.30 | 0.30 | 0.30 | 0.30 |
| Sweetness intensity/acidity | 5.0 | 5.0 | 5.0 | 5.0 | 5.0 | 5.0 | 5.0 |
| Energy | 1 | 7 | 18 | 29 | 40 | 51 | 57 |
| Reduction of alcohol's distinctive pungency | — | 1.3 | 2.0 | 2.0 | 1.5 | 1.0 | 1.0 |
| Natural sweetness | 2.3 | 2.3 | 1.8 | 1.5 | 1.0 | 1.0 | 1.0 |
| Quality in aftertaste | 2.7 | 2.3 | 2.0 | 1.3 | 1.0 | 1.0 | 1.0 |
| Overall evaluation | 3.0 | 2.6 | 2.3 | 1.8 | 1.2 | 1.0 | 1.0 |

TABLE 4

| Sample No. | | Rebaudioside A | | | | | | | Rebaudioside D | | | | | | |
|---|---|---|---|---|---|---|---|---|---|---|---|---|---|---|---|
| | | T-0 | T-1 | T-3 | T-5 | T-7 | T-9 | T-10 | C-0 | C-1 | C-3 | C-5 | C-7 | C-9 | C-10 |
| Neutral alcohol | ml/1000 ml | 0 | 17 | 51 | 85 | 119 | 153 | 170 | 0 | 17 | 51 | 85 | 119 | 153 | 170 |
| Citric acid anhydrous | g/1000 ml | 3.3 | 3.3 | 3.3 | 3.3 | 3.3 | 3.3 | 3.3 | 3.3 | 3.3 | 3.3 | 3.3 | 3.3 | 3.3 | 3.3 |
| Rebaudioside A | g/1000 ml | 0.05 | 0.05 | 0.05 | 0.05 | 0.05 | 0.05 | 0.05 | 0 | 0 | 0 | 0 | 0 | 0 | 0 |
| Rebaudioside D | g/1000 ml | 0 | 0 | 0 | 0 | 0 | 0 | 0 | 0.05 | 0.05 | 0.05 | 0.05 | 0.05 | 0.05 | 0.05 |
| Alcohol | v/v % | 0 | 1 | 3 | 5 | 7 | 9 | 10 | 0 | 1 | 3 | 5 | 7 | 9 | 10 |
| Sweetness intensity | — | 1.5 | 1.5 | 1.5 | 1.5 | 1.5 | 1.5 | 1.5 | 1.5 | 1.5 | 1.5 | 1.5 | 1.5 | 1.5 | 1.5 |
| Acidity | w/v % | 0.30 | 0.30 | 0.30 | 0.30 | 0.30 | 0.30 | 0.30 | 0.30 | 0.30 | 0.30 | 0.30 | 0.30 | 0.30 | 0.30 |

TABLE 4-continued

| | | Rebaudioside A | | | | | | | Rebaudioside D | | | | | | |
|---|---|---|---|---|---|---|---|---|---|---|---|---|---|---|---|
| Sample No. | | T-0 | T-1 | T-3 | T-5 | T-7 | T-9 | T-10 | C-0 | C-1 | C-3 | C-5 | C-7 | C-9 | C-10 |
| Sweetness intensity/acidity | — | 5.0 | 5.0 | 5.0 | 5.0 | 5.0 | 5.0 | 5.0 | 5.0 | 5.0 | 5.0 | 5.0 | 5.0 | 5.0 | 5.0 |
| Energy | kcal/100 ml | 1 | 7 | 18 | 29 | 40 | 51 | 57 | 1 | 7 | 18 | 29 | 40 | 51 | 57 |
| Reduction of alcohol's distinctive pungency | — | — | 1.2 | 1.5 | 1.3 | 1.3 | 1.0 | 1.0 | — | 1.7 | 2.0 | 3.0 | 3.5 | 4.0 | 4.0 |
| Natural sweetness | — | 2.7 | 2.7 | 2.7 | 2.3 | 2.0 | 1.8 | 1.8 | 4.0 | 4.0 | 4.0 | 4.0 | 4.0 | 3.8 | 3.8 |
| Quality in aftertaste | — | 2.3 | 2.3 | 1.8 | 1.4 | 1.0 | 1.0 | 1.0 | 4.0 | 4.0 | 4.0 | 4.0 | 3.7 | 3.2 | 3.0 |
| Overall evaluation | — | 2.8 | 2.7 | 2.5 | 1.8 | 1.3 | 1.0 | 1.0 | 4.0 | 4.0 | 4.0 | 3.8 | 3.5 | 3.2 | 3.0 |

TABLE 5

| | | Rebaudioside M | | | | | | |
|---|---|---|---|---|---|---|---|---|
| Sample No. | | M-0 | M-1 | M-3 | M-5 | M-7 | M-9 | M-10 |
| Neutral alcohol | ml/1000 ml | 0 | 17 | 51 | 85 | 119 | 153 | 170 |
| Citric acid anhydrous | g/1000 ml | 3.3 | 3.3 | 3.3 | 3.3 | 3.3 | 3.3 | 3.3 |
| Rebaudioside M | g/1000 ml | 0.05 | 0.05 | 0.05 | 0.05 | 0.05 | 0.05 | 0.05 |
| Alcohol | v/v % | 0 | 1 | 3 | 5 | 7 | 9 | 10 |
| Sweetness intensity | — | 1.5 | 1.5 | 1.5 | 1.5 | 1.5 | 1.5 | 1.5 |
| Acidity | w/v % | 0.30 | 0.30 | 0.30 | 0.30 | 0.30 | 0.30 | 0.30 |
| Sweetness intensity/acidity | — | 5.0 | 5.0 | 5.0 | 5.0 | 5.0 | 5.0 | 5.0 |
| Energy | kcal/100 ml | 1 | 7 | 18 | 29 | 40 | 51 | 57 |
| Reduction of alcohol's distinctive pungency | — | — | 1.7 | 2.0 | 3.2 | 3.5 | 4.0 | 4.0 |
| Natural sweetness | — | 4.2 | 4.2 | 4.2 | 4.2 | 4.2 | 3.9 | 3.8 |
| Quality in aftertaste | — | 4.0 | 4.0 | 4.0 | 4.0 | 3.8 | 3.5 | 3.2 |
| Overall evaluation | — | 4.0 | 4.0 | 4.0 | 3.9 | 3.7 | 3.5 | 3.3 |

[Example 2] Evaluation of Effect on Flavor of Alcoholic Beverage Further Containing Sodium As in Example 1, neutral alcohol, a sweetener, an acidic flavor substance, water and carbon dioxide were mixed in blending amounts as shown in Tables 6 to 8, and a can container was filled with the mixture to prepare a sample liquid. The raw materials used are as follows: rebaudioside D: purity 90% or more, citric acid anhydrous. "Citric Acid anhydrous" from Jungbunzlauer AG, and trisodium citrate: "Purified Sodium Citrate" from Fuso Chemical Co., Ltd. After the raw materials for each sample were blended, carbon dioxide gas was injected to a gas pressure of about 1.7 kgf/cm$^2$ at a liquid temperature of 20° C.

For "reduction of alcohol's distinctive pungency," "natural sweetness," "quality in aftertaste" and "overall evaluation," three trained specialist panelists evaluated each of the thus-prepared samples in accordance with the same criteria as in Example 1. The sodium content in the beverage was calculated from the amount of sodium citrate added, and the energy (kcal/100 ml) was calculated with RebD and the sodium-derived compound considered to have an energy of 0 (kcal/100 ml). The test was conducted on three types of beverage samples having different values of degree of sweetness/degree of sourness. Tables 6 to 8 show the results.

TABLE 6

Change in quality of taste with amount of Na added (sweetness intensity/acidity: 5)

| Sample No. | Unit | X-0 | X-10 | X-20 | X-30 | X-50 | X-70 |
|---|---|---|---|---|---|---|---|
| Neutral alcohol | ml/1000 ml | 119 | 119 | 119 | 119 | 119 | 119 |
| Citric acid anhydrous | g/1000 ml | 3.3 | 3.3 | 3.3 | 3.3 | 3.3 | 3.3 |
| Sodium citrate | g/1000 ml | 0.00 | 0.43 | 0.86 | 1.29 | 2.15 | 3.00 |
| Rebaudioside D | g/1000 ml | 0.05 | 0.05 | 0.05 | 0.05 | 0.05 | 0.05 |
| Alcohol | v/v % | 7 | 7 | 7 | 7 | 7 | 7 |
| Amount of sodium | mg/100 ml | 0 | 10 | 20 | 30 | 50 | 70 |
| Sweetness intensity | — | 1.5 | 1.5 | 1.5 | 1.5 | 1.5 | 1.5 |
| Acidity | w/v % | 0.30 | 0.30 | 0.30 | 0.30 | 0.30 | 0.30 |
| Sweetness intensity/acidity | — | 5.0 | 5.0 | 5.0 | 5.0 | 5.0 | 5.0 |
| Energy | kcal/100 ml | 40 | 41 | 41 | 41 | 41 | 41 |
| Reduction of alcohol's distinctive pungency | — | — | 3.5 | 3.8 | 4.3 | 4.7 | 4.8 | 4.8 |

TABLE 6-continued

Change in quality of taste with amount of Na added (sweetness intensity/acidity: 5)

| | | | | | | | |
|---|---|---|---|---|---|---|---|
| Natural sweetness | — | 4.0 | 4.0 | 4.2 | 4.3 | 4.3 | 4.3 |
| Quality in aftertaste | — | 3.7 | 4.0 | 4.2 | 4.3 | 4.3 | 3.9 |
| Overall evaluation | — | 3.5 | 4.0 | 4.5 | 4.7 | 4.7 | 4.5 |

| Sample No. | X-90 | X-110 | X-130 | X-150 | X-170 | X-190 | X-200 |
|---|---|---|---|---|---|---|---|
| Neutral alcohol | 119 | 119 | 119 | 119 | 119 | 119 | 119 |
| Citric acid anhydrous | 3.3 | 3.3 | 3.3 | 3.3 | 3.3 | 3.3 | 3.3 |
| Sodium citrate | 3.84 | 4.68 | 5.53 | 6.38 | 7.23 | 8.08 | 8.53 |
| Rebaudioside D | 0.05 | 0.05 | 0.05 | 0.05 | 0.05 | 0.05 | 0.05 |
| Alcohol | 7 | 7 | 7 | 7 | 7 | 7 | 7 |
| Amount of sodium | 90 | 110 | 130 | 150 | 170 | 190 | 200 |
| Sweetness intensity | 1.5 | 1.5 | 1.5 | 1.5 | 1.5 | 1.5 | 1.5 |
| Acidity | 0.30 | 0.30 | 0.30 | 0.30 | 0.30 | 0.30 | 0.30 |
| Sweetness intensity/acidity | 5.0 | 5.0 | 5.0 | 5.0 | 5.0 | 5.0 | 5.0 |
| Energy | 42 | 42 | 42 | 42 | 42 | 43 | 43 |
| Reduction of alcohol's distinctive pungency | 4.5 | 4.3 | 4.2 | 4.2 | 4.2 | 4.2 | 4.2 |
| Natural sweetness | 3.5 | 3.3 | 3.2 | 2.8 | 2.7 | 2.7 | 2.7 |
| Quality in aftertaste | 3.6 | 3.5 | 3.2 | 2.5 | 2.3 | 2.2 | 2.2 |
| Overall evaluation | 4.0 | 3.7 | 3.3 | 2.7 | 2.7 | 2.5 | 2.5 |

TABLE 7

Change in quality of taste with amount of Na added (sweetness intensity/acidity: 20)

| Sample No. | Unit | Y-0 | Y-10 | Y-20 | Y-30 | Y-50 | Y-70 |
|---|---|---|---|---|---|---|---|
| Neutral alcohol | ml/1000 ml | 119 | 119 | 119 | 119 | 119 | 119 |
| Citric acid anhydrous | g/1000 ml | 3.3 | 3.3 | 3.3 | 3.3 | 3.3 | 3.3 |
| Sodium citrate | g/1000 ml | 0 | 0.43 | 0.86 | 1.29 | 2.15 | 3.00 |
| Rebaudioside D | g/1000 ml | 0.20 | 0.20 | 0.20 | 0.20 | 0.20 | 0.20 |
| Alcohol | v/v % | 7 | 7 | 7 | 7 | 7 | 7 |
| Amount of sodium | mg/100 ml | 0 | 10 | 20 | 30 | 50 | 70 |
| Sweetness intensity | — | 6.0 | 6.0 | 6.0 | 6.0 | 6.0 | 6.0 |
| Acidity | w/v % | 0.3 | 0.3 | 0.3 | 0.3 | 0.3 | 0.3 |
| Sweetness intensity/acidity | — | 20 | 20 | 20 | 20 | 20 | 20 |
| Energy | kcal/100 ml | 40 | 41 | 41 | 41 | 41 | 41 |
| Reduction of alcohol's distinctive pungency | — | 3.5 | 4.0 | 4.4 | 4.9 | 4.9 | 4.9 |
| Natural sweetness | — | 4.0 | 4.0 | 4.1 | 4.4 | 4.4 | 4.4 |
| Quality in aftertaste | — | 3.7 | 4.0 | 4.1 | 4.4 | 4.4 | 4.2 |
| Overall evaluation | — | 3.5 | 4.0 | 4.3 | 4.9 | 4.9 | 4.7 |

| Sample No. | Y-90 | Y-110 | Y-130 | Y-150 | Y-170 | Y-190 | Y-200 |
|---|---|---|---|---|---|---|---|
| Neutral alcohol | 119 | 119 | 119 | 119 | 119 | 119 | 119 |
| Citric acid anhydrous | 3.3 | 3.3 | 3.3 | 3.3 | 3.3 | 3.3 | 3.3 |
| Sodium citrate | 3.84 | 4.68 | 5.53 | 6.38 | 7.23 | 8.08 | 8.53 |
| Rebaudioside D | 0.20 | 0.20 | 0.20 | 0.20 | 0.20 | 0.20 | 0.20 |
| Alcohol | 7 | 7 | 7 | 7 | 7 | 7 | 7 |
| Amount of sodium | 90 | 110 | 130 | 150 | 170 | 190 | 200 |
| Sweetness intensity | 6.0 | 6.0 | 6.0 | 6.0 | 6.0 | 6.0 | 6.0 |
| Acidity | 0.3 | 0.3 | 0.3 | 0.3 | 0.3 | 0.3 | 0.3 |
| Sweetness intensity/acidity | 20 | 20 | 20 | 2.0 | 20 | 20 | 20 |
| Energy | 42 | 42 | 42 | 42 | 42 | 43 | 43 |
| Reduction of alcohol's distinctive pungency | 4.8 | 4.5 | 4.3 | 4.3 | 4.1 | 4.1 | 4.1 |
| Natural sweetness | 3.8 | 3.7 | 3.4 | 3.1 | 2.8 | 2.8 | 2.7 |
| Quality in aftertaste | 3.8 | 3.5 | 3.0 | 3.0 | 2.4 | 2.4 | 2.2 |
| Overall evaluation | 4.4 | 4.0 | 3.8 | 3.4 | 3.1 | 2.5 | 2.5 |

TABLE 8

Change in quality of taste with amount of Na added (sweetness intensity/acidity: 40)

| Sample No. | Unit | Z-0 | Z-10 | Z-20 | Z-30 | Z-50 | Z-70 |
|---|---|---|---|---|---|---|---|
| Neutral alcohol | ml/1000 ml | 119 | 119 | 119 | 119 | 119 | 119 |
| Citric acid anhydrous | g/1000 ml | 2.2 | 2.2 | 2.2 | 2.2 | 2.2 | 2.2 |
| Sodium citrate | g/1000 ml | 0.00 | 0.43 | 0.86 | 1.29 | 2.15 | 3.00 |
| Rebaudioside D | g/1000 ml | 0.268 | 0.268 | 0.268 | 0.268 | 0.268 | 0.268 |
| Alcohol | v/v % | 7 | 7 | 7 | 7 | 7 | 7 |
| Amount of sodium | mg/100 ml | 0 | 10 | 20 | 30 | 50 | 70 |
| Sweetness intensity | — | 8.0 | 8.0 | 8.0 | 8.0 | 8.0 | 8.0 |
| Acidity | w/v % | 0.20 | 0.20 | 0.20 | 0.20 | 0.20 | 0.20 |
| Sweetness intensity/acidity | — | 40 | 40 | 40 | 40 | 40 | 40 |
| Energy | kcal/100 ml | 40 | 41 | 41 | 41 | 41 | 41 |
| Reduction of alcohol's distinctive pungency | — | | 2.3 | 3.8 | 4.3 | 4.7 | 4.5 | 4.2 |
| Natural sweetness | — | | 3.8 | 3.9 | 4.2 | 4.3 | 4.5 | 4.2 |
| Quality in aftertaste | — | | 3.8 | 4.0 | 4.2 | 4.3 | 4.1 | 3.4 |
| Overall evaluation | — | | 3.5 | 4.0 | 4.5 | 4.7 | 4.3 | 3.8 |

| Sample No. | Z-90 | Z-110 | Z-130 | Z-150 | Z-170 | Z-190 | Z-200 |
|---|---|---|---|---|---|---|---|
| Neutral alcohol | 119 | 119 | 119 | 119 | 119 | 119 | 119 |
| Citric acid anhydrous | 2.2 | 2.2 | 2.2 | 2.2 | 2.2 | 2.2 | 2.2 |
| Sodium citrate | 3.84 | 4.68 | 5.53 | 6.38 | 7.23 | 8.08 | 8.53 |
| Rebaudioside D | 0.268 | 0.268 | 0.268 | 0.268 | 0.268 | 0.268 | 0.268 |
| Alcohol | 7 | 7 | 7 | 7 | 7 | 7 | 7 |
| Amount of sodium | 90 | 110 | 130 | 150 | 170 | 190 | 200 |
| Sweetness intensity | 8.0 | 8.0 | 8.0 | 8.0 | 8.0 | 8.0 | 8.0 |
| Acidity | 0.20 | 0.20 | 0.20 | 0.20 | 0.20 | 0.20 | 0.20 |
| Sweetness intensity/acidity | 40 | 40 | 40 | 40 | 40 | 40 | 40 |
| Energy | 42 | 42 | 42 | 42 | 42 | 43 | 43 |
| Reduction of alcohol's distinctive pungency | 4.2 | 4.0 | 3.8 | 3.8 | 3.5 | 3.5 | 3.5 |
| Natural sweetness | 3.8 | 3.3 | 2.8 | 2.7 | 2.5 | 2.3 | 2.3 |
| Quality in aftertaste | 3.3 | 3.0 | 2.3 | 2.2 | 2.0 | 1.5 | 1.5 |
| Overall evaluation | 3.7 | 3.4 | 3.0 | 2.6 | 2.3 | 2.0 | 2.0 |

[Example 3] Evaluation of Effect of Difference in Amount of RebD on Flavor of Alcoholic Beverage As in Example 1, neutral alcohol, a sweetener, an acidic flavor substance, water and carbon dioxide were mixed in blending amounts as shown in Table 9, and a can container was filled with the mixture to prepare a sample liquid. For evaluating the effect of a difference in amount of RebD, the sweetness intensity/acidity was adjusted to a certain value. The raw materials used areas follows: rebaudioside D: purity 90% or more, citric acid anhydrous: "Citric Acid anhydrous" from Jungbunzlauer AG, and trisodium citrate: "Purified Sodium Citrate" from Fuso Chemical Co., Ltd. After the raw materials for each sample were blended, carbon dioxide gas was injected to a gas pressure of about 1.7 kgf/cm$^2$ at a liquid temperature of 20° C.

For "reduction of alcohol's distinctive pungency," "natural sweetness," "quality in aftertaste" and "overall evaluation," three trained specialist panelists evaluated each of the thus-prepared samples in accordance with the same criteria as in Example 1. The sodium content in the beverage was calculated from the amount of sodium citrate added, and the energy (kcal/100 ml) was calculated with RebD and the sodium-derived compound considered to have an energy of 0 (kcal/100 ml). Table 9 shows the results.

TABLE 9

| Sample No. | | D1 | D10 | D50 | D100 | D200 | D300 | D400 | D500 |
|---|---|---|---|---|---|---|---|---|---|
| Neutral alcohol | ml/1000 ml | 119 | 119 | 119 | 119 | 119 | 119 | 119 | 119 |
| Citric acid anhydrous | g/1000 ml | 0.0165 | 0.165 | 0.825 | 1.65 | 3.3 | 4.95 | 6.6 | 8.25 |
| Sodium citrate | g/1000 ml | 4.26 | 4.26 | 4.26 | 4.26 | 4.26 | 4.26 | 4.26 | 4.26 |
| Rebaudioside D | g/1000 ml | 0.001 | 0.010 | 0.050 | 0.100 | 0.200 | 0.300 | 0.400 | 0.500 |
| Alcohol | v/v % | 7.0 | 7.0 | 7.0 | 7.0 | 7.0 | 7.0 | 7.0 | 7.0 |
| Amount of sodium | mg/100 ml | 100 | 100 | 100 | 100 | 100 | 100 | 100 | 100 |
| Sweetness intensity | — | 0.03 | 0.3 | 1.5 | 3.0 | 6.0 | 9.0 | 12.0 | 15.0 |
| Acidity | w/v % | 0.0015 | 0.015 | 0.075 | 0.15 | 0.30 | 0.45 | 0.60 | 0.75 |
| Sweetness intensity/acidity | — | 20 | 20 | 20 | 20 | 20 | 20 | 20 | 20 |
| Energy | kcal/1000 ml | 40 | 40 | 41 | 41 | 42 | 42 | 43 | 43 |
| Reduction of alcohol's distinctive pungency | — | 2.5 | 3.2 | 3.8 | 4.1 | 4.7 | 4.8 | 4.8 | 5.0 |
| Natural sweetness | — | 2.3 | 2.8 | 4.2 | 4.3 | 4.5 | 4.5 | 4.3 | 4.3 |
| Quality in aftertaste | — | 2.7 | 3.3 | 4.0 | 4.2 | 4.5 | 4.5 | 4.2 | 4.2 |
| Overall evaluation | — | 2.3 | 3.0 | 4.0 | 4.1 | 4.5 | 4.6 | 4.4 | 4.5 |

[Example 4] Evaluation of Effect of Difference in Acidity on Flavor of Alcoholic Beverage As in Example 1, neutral alcohol, a sweetener, an acidic flavor substance, water and carbon dioxide were mixed in blending amounts as shown in Table 10, and a can container was filled with the mixture to prepare a sample liquid. The raw materials used are as follows: rebaudioside D: purity 90% or more, citric acid anhydrous: "Citric Acid anhydrous" from Jungbunzlauer AG, and trisodium citrate: "Purified Sodium Citrate" from Fuso Chemical Co., Ltd. After the raw materials for each sample were blended, carbon dioxide gas was injected to a gas pressure of about 1.7 kgf/cm$^2$ at a liquid temperature of 20° C.

For "reduction of alcohol's distinctive pungency," "natural sweetness," "quality in aftertaste" and "overall evaluation," three trained specialist panelists evaluated each of the thus-prepared samples in accordance with the same criteria as in Example 1. The sodium content in the beverage was calculated from the amount of sodium citrate added, and the energy (kcal/100 ml) was calculated with RebD and the sodium-derived compound considered to have an energy of 0 (kcal/100 ml). Table 10 shows the results.

TABLE 10

| Sample No. | | TA0.01 | TA0.05 | TA0.1 | TA1 | TA2 | TA3 | TA4 | TA5 |
|---|---|---|---|---|---|---|---|---|---|
| Neutral alcohol | ml/1000 ml | 119 | 119 | 119 | 119 | 119 | 119 | 119 | 119 |
| Citric acid anhydrous | g/1000 ml | 0.1 | 0.5 | 1.1 | 10.9 | 21.9 | 32.8 | 43.8 | 54.7 |
| Sodium citrate | g/1000 ml | 4.26 | 4.26 | 4.26 | 4.26 | 4.26 | 4.26 | 4.26 | 4.26 |
| Rebaudioside D | g/1000 ml | 0.200 | 0.200 | 0.200 | 0.200 | 0.200 | 0.200 | 0.200 | 0.200 |
| Alcohol | v/v % | 7.0 | 7.0 | 7.0 | 7.0 | 7.0 | 7.0 | 7.0 | 7.0 |
| Amount of sodium | mg/100 ml | 100 | 100 | 100 | 100 | 100 | 100 | 100 | 100 |
| Sweetness intensity | — | 6.0 | 6.0 | 6.0 | 6.0 | 6.0 | 6.0 | 6.0 | 6.0 |
| Acidity | w/v % | 0.01 | 0.05 | 0.10 | 1.0 | 2.0 | 3.0 | 4.0 | 5.0 |
| Sweetness intensity/acidity | — | 656 | 131 | 60 | 6 | 3 | 2 | 1.5 | 1.2 |
| Energy | kcal/100 ml | 40 | 40 | 41 | 45 | 49 | 54 | 58 | 62 |
| Reduction of alcohol's distinctive pungency | — | 4.2 | 4.2 | 4.5 | 4.7 | 4.7 | 4.4 | 4.3 | 2.8 |
| Natural sweetness | — | 3.8 | 4.2 | 4.2 | 4.3 | 4.1 | 3.5 | 3.4 | 2.0 |
| Quality in aftertaste | — | 3.5 | 3.8 | 4.2 | 4.3 | 4.1 | 3.8 | 3.5 | 1.7 |
| Overall evaluation | — | 3.7 | 4.0 | 4.3 | 4.5 | 4.3 | 4.0 | 3.8 | 2.2 |

[Example 5] Evaluation of Effect of RebD/RebM on Flavor of High-Concentration Alcoholic Beverage <Preparation of Sample>

As in Example 1, neutral alcohol, a sweetener, an acidic flavor substance and water were mixed in blending amounts as shown in Tables 11 and 12, and a can container was filled with the mixture to prepare a sample liquid. The raw materials used are as follows: sugar: "Granulated Sugar GS" from Mitsui Sugar Co., Ltd., high-fructose corn syrup: "High Fructoca" from Kato Kagaku Co., Ltd., acesulfame K: "sunett" from Celanese Production Germany GmbH & Co. KG, sucralose: "Sucralose" from Tate & Lyle Japan KK., rebaudioside A: purity 95.0% or more, rebaudioside D: purity 90% or more, rebaudioside M: purity 96.6%, and citric acid anhydrous: "Citric Acid anhydrous" from Jungbunzlauer AG. In this Example, carbon dioxide gas was not injected.

For "reduction of alcohol's distinctive pungency," "natural sweetness," "quality in aftertaste" and "overall evaluation," three trained specialist panelists evaluated each of the thus-prepared samples in accordance with the same criteria as in Example 1. The energy (kcal/100 ml) was calculated with acesulfame K, sucralose, rebaudioside A, rebaudioside D and rebaudioside M considered to have an energy of 0 (kcal/100 ml). Tables 11 and 12 show the results.

TABLE 11

| | | Sugar | | | High-fructose corn syrup | | | Acesulfame K | | | Sucralose | | |
|---|---|---|---|---|---|---|---|---|---|---|---|---|---|
| Sample No. | Unit | S-20 | S-30 | S-40 | B-20 | B-30 | B-40 | F-20 | F-30 | F-40 | G-20 | G-30 | G-40 |
| Neutral alcohol | ml/1000 ml | 340 | 510 | 680 | 340 | 510 | 680 | 340 | 510 | 680 | 340 | 510 | 680 |
| Citric acid anhydrous | g/1000 ml | 3.3 | 3.3 | 3.3 | 3.3 | 3.3 | 3.3 | 3.3 | 3.3 | 3.3 | 3.3 | 3.3 | 3.3 |

TABLE 11-continued

| Sample No. | Unit | Sugar | | | High-fructose corn syrup | | | Acesulfame K | | | Sucralose | | |
|---|---|---|---|---|---|---|---|---|---|---|---|---|---|
| | | S-20 | S-30 | S-40 | B-20 | B-30 | B-40 | F-20 | F-30 | F-40 | G-20 | G-30 | G-40 |
| Sugar | g/1000 ml | 15 | 15 | 15 | 0 | 0 | 0 | 0 | 0 | 0 | 0 | 0 | 0 |
| High-fructose corn syrup | g/1000 ml | 0 | 0 | 0 | 20 | 20 | 20 | 0 | 0 | 0 | 0 | 0 | 0 |
| Acesulfame K | g/1000 ml | 0 | 0 | 0 | 0 | 0 | 0 | 0.075 | 0.075 | 0.075 | 0 | 0 | 0 |
| Sucralose | g/1000 ml | 0 | 0 | 0 | 0 | 0 | 0 | 0 | 0 | 0 | 0.025 | 0.025 | 0.025 |
| Alcohol | v/v % | 20 | 30 | 40 | 20 | 30 | 40 | 20 | 30 | 40 | 20 | 30 | 40 |
| Sweetness intensity | — | 1.5 | 1.5 | 1.5 | 1.5 | 1.5 | 1.5 | 1.5 | 1.5 | 1.5 | 1.5 | 1.5 | 1.5 |
| Acidity | w/v % | 0.3 | 0.3 | 0.3 | 0.3 | 0.3 | 0.3 | 0.3 | 0.3 | 0.3 | 0.3 | 0.3 | 0.3 |
| Sweetness intensity/acidity | — | 5 | 5 | 5 | 5 | 5 | 5 | 5 | 5 | 5 | 5 | 5 | 5 |
| Energy | kcal/100 ml | 119 | 174 | 230 | 119 | 174 | 230 | 113 | 168 | 224 | 113 | 168 | 224 |
| Reduction of alcohol's distinctive pungency | — | 1.5 | 1.0 | 1.0 | 1.5 | 1.0 | 1.0 | 1.0 | 1.0 | 1.0 | 1.0 | 1.0 | 1.0 |
| Natural sweetness | — | 3.5 | 2.8 | 2.5 | 3.4 | 2.7 | 2.4 | 1.0 | 1.0 | 1.0 | 1.0 | 1.0 | 1.0 |
| Quality in aftertaste | — | 1.3 | 1.0 | 1.0 | 1.3 | 1.0 | 1.0 | 1.0 | 1.0 | 1.0 | 1.0 | 1.0 | 1.0 |
| Overall evaluation | — | 1.5 | 1.0 | 1.0 | 1.4 | 1.0 | 1.0 | 1.0 | 1.0 | 1.0 | 1.0 | 1.0 | 1.0 |

TABLE 12

| Sample No. | Unit | Rebaudioside A | | | Rebaudioside D | | | Rebaudioside M | | |
|---|---|---|---|---|---|---|---|---|---|---|
| | | T-20 | T-30 | T-40 | C-20 | C-30 | C-40 | M-20 | M-30 | M-40 |
| Neutral alcohol | ml/1000 ml | 340 | 510 | 680 | 340 | 510 | 680 | 340 | 510 | 680 |
| Citric acid anhydrous | g/1000 ml | 3.3 | 3.3 | 3.3 | 3.3 | 3.3 | 3.3 | 3.3 | 3.3 | 3.3 |
| Rebaudioside A | g/1000 ml | 0.05 | 0.05 | 0.05 | 0 | 0 | 0 | 0 | 0 | 0 |
| Rebaudioside D | g/1000 ml | 0 | 0 | 0 | 0.05 | 0.05 | 0.05 | 0 | 0 | 0 |
| Rebaudioside M | g/1000 ml | 0 | 0 | 0 | 0 | 0 | 0 | 0.05 | 0.05 | 0.05 |
| Alcohol | v/v % | 20 | 30 | 40 | 20 | 30 | 40 | 20 | 30 | 40 |
| Sweetness intensity | — | 1.5 | 1.5 | 1.5 | 1.5 | 1.5 | 1.5 | 1.5 | 1.5 | 1.5 |
| Acidity | w/v % | 0.3 | 0.3 | 0.3 | 0.3 | 0.3 | 0.3 | 0.3 | 0.3 | 0.3 |
| Sweetness intensity/acidity | — | 5 | 5 | 5 | 5 | 5 | 5 | 5 | 5 | 5 |
| Energy | kcal/100 ml | 113 | 168 | 224 | 113 | 168 | 224 | 113 | 168 | 224 |
| Reduction of alcohol's distinctive pungency | — | 1.0 | 1.0 | 1.0 | 3.6 | 3.2 | 3.0 | 3.6 | 3.2 | 3.0 |
| Natural sweetness | — | 1.5 | 1.1 | 1.1 | 3.4 | 2.8 | 2.7 | 3.3 | 2.8 | 2.7 |
| Quality in aftertaste | — | 1.0 | 1.0 | 1.0 | 2.8 | 2.7 | 2.2 | 2.9 | 2.6 | 2.2 |
| Overall evaluation | — | 1.0 | 1.0 | 1.0 | 3.0 | 2.8 | 2.5 | 3.1 | 2.9 | 2.6 |

[Example 6] Evaluation of Effect on Flavor of Alcoholic Beverage Further Containing Potassium As in Example 1, neutral alcohol, a sweetener, an acidic flavor substance, water and carbon dioxide were mixed in blending amounts as shown in Table 13, and a can container was filled with the mixture to prepare a sample liquid. The raw materials used are as follows: rebaudioside D: purity 90% or more, citric acid anhydrous: "Citric Acid anhydrous" from Jungbunzlauer AG, and potassium citrate (tripotassium citrate): "Tripotassium Citrate" from Jungbunzlauer AG. After the raw materials for each sample were blended, carbon dioxide gas was injected to a gas pressure of about 1.7 kgf/cm$^2$ at a liquid temperature of 20° C.

For "reduction of alcohol's distinctive pungency," "natural sweetness," "quality in aftertaste" and "overall evaluation," three trained specialist panelists evaluated each of the thus-prepared samples in accordance with the same criteria as in Example 1. The potassium content in the beverage was calculated from the amount of tripotassium citrate added, and the energy (kcal/100 ml) was calculated with RebD and the potassium-derived compound considered to have an energy of 0 (kcal/100 ml). Table 13 shows the results. For comparison, the results for a sample (Y-0) in which the "sweetness intensity/acidity" is 20 in Example 2 and potassium is not present are also shown.

TABLE 13

Change in quality of taste with amount of K added (sweetness intensity/acidity: 20)

| Sample No. | Unit | Y-0 | K-10 | K-20 | K-30 | K-100 | K-150 | K-200 | K-250 | K-300 |
|---|---|---|---|---|---|---|---|---|---|---|
| Neutral alcohol | ml/1000 ml | 119 | 119 | 119 | 119 | 119 | 119 | 119 | 119 | 119 |
| Citric acid anhydrous | g/1000 ml | 3.3 | 3.3 | 3.3 | 3.3 | 3.3 | 3.3 | 3.3 | 3.3 | 3.3 |
| Potassium citrate | g/1000 ml | 0 | 0.27 | 0.54 | 0.81 | 2.79 | 4.18 | 5.58 | 6.97 | 8.36 |

TABLE 13-continued

Change in quality of taste with amount of K added (sweetness intensity/acidity: 20)

| Sample No. | Unit | Y-0 | K-10 | K-20 | K-30 | K-100 | K-150 | K-200 | K-250 | K-300 |
|---|---|---|---|---|---|---|---|---|---|---|
| Rebaudioside D | g/1000 ml | 0.2 | 0.2 | 0.2 | 0.2 | 0.2 | 0.2 | 0.2 | 0.2 | 0.2 |
| Alcohol | v/v % | 7 | 7 | 7 | 7 | 7 | 7 | 7 | 7 | 7 |
| Amount of potassium | mg/100 ml | 0 | 10 | 20 | 30 | 100 | 150 | 200 | 250 | 300 |
| Sweetness intensity | — | 6 | 6 | 6 | 6 | 6 | 6 | 6 | 6 | 6 |
| Acidity | w/v % | 0.3 | 0.3 | 0.3 | 0.3 | 0.3 | 0.3 | 0.3 | 0.3 | 0.3 |
| Sweetness intensity/acidity | — | 20 | 20 | 20 | 20 | 20 | 20 | 20 | 20 | 20 |
| Energy | kcal/100 ml | 40 | 41 | 41 | 41 | 42 | 43 | 43 | 43 | 44 |
| Reduction of alcohol's distinctive pungency | — | | 3.5 | 4.0 | 4.4 | 4.9 | 4.9 | 4.4 | 4.2 | 4.2 | 4.2 |
| Natural sweetness | — | | 4.0 | 4.0 | 4.0 | 4.4 | 3.9 | 3.2 | 2.9 | 2.7 | 2.6 |
| Quality in aftertaste | — | | 3.7 | 4.0 | 4.1 | 4.4 | 3.9 | 3.2 | 2.3 | 2.2 | 2.2 |
| Overall evaluation | — | | 3.5 | 4.0 | 4.3 | 4.9 | 4.4 | 3.6 | 2.8 | 2.6 | 2.5 |

[Example 7] Evaluation of Effect of RebM on Flavor of Alcoholic Beverage

As in Example 1, neutral alcohol, a sweetener, an acidic flavor substance, water and carbon dioxide were mixed in blending amounts as shown in Table 14, and a can container was filled with the mixture to prepare a sample liquid. For evaluating the effect of a difference in amount of RebM, the sweetness intensity/acidity was adjusted to a certain value. The raw materials used are as follows: rebaudioside M: purity 96.6%, citric acid anhydrous: "Citric Acid anhydrous" from Jungbunzlauer AG, and trisodium citrate: "Purified Sodium Citrate" from Fuso Chemical Co., Ltd. After the raw materials for each sample were blended, carbon dioxide gas was injected to a gas pressure of about 1.7 kgf/cm² at a liquid temperature of 20° C.

For "reduction of alcohol's distinctive pungency," "natural sweetness," "quality in aftertaste" and "overall evaluation," three trained specialist panelists evaluated each of the thus-prepared samples in accordance with the same criteria as in Example 1. The sodium content in the beverage was calculated from the amount of sodium citrate added, and the energy (kcal/100 ml) was calculated with RebM and the sodium-derived compound considered to have an energy of 0 (kcal/100 ml). Table 14 shows the results.

[Example 8] Evaluation of Effect of Difference in Acidic Flavor Substance on Flavor of Alcoholic Beverage As in Example 1, neutral alcohol, a sweetener, an acidic flavor substance, water and carbon dioxide were mixed in blending amounts as shown in Table 15, and a can container was filled with the mixture to prepare a sample liquid. The raw materials used are as follows: rebaudioside D: purity 90% or more, citric acid anhydrous: "Citric Acid anhydrous" from Jungbunzlauer AG, trisodium citrate: "Purified Sodium Citrate" from Fuso Chemical Co., Ltd., malic acid: "Fuso Malic Acid" from Fuso Chemical Co., Ltd., lactic acid: "Lactic Acid (50%)" from KYOWA PHARMA CHEMICAL CO., LTD., phosphoric acid: "75% Phosphoric Acid for Food Additives" from Nippon Chemical Industrial CO., LTD, and tartaric acid: "L-Tartaric Acid" from IWATA CHEMICAL CO., LTD. After the raw materials for each sample were blended, carbon dioxide gas was injected to a gas pressure of about 1.7 kgf/cm² at a liquid temperature of 20° C.

For "reduction of alcohol's distinctive pungency," "natural sweetness," "quality in aftertaste" and "overall evaluation," three trained specialist panelists evaluated each of the thus-prepared samples in accordance with the same criteria as in Example 1. The sodium content in the beverage was calculated from the amount of sodium citrate added, and the energy (kcal/100 ml) was calculated with RebD and the sodium-derived compound considered to have an energy of 0 (kcal/100 ml). Table 15 shows the results.

TABLE 14

| Sample No. | Unit | M1 | M10 | M50 | M100 | M200 | M300 | M400 | M500 | M660 |
|---|---|---|---|---|---|---|---|---|---|---|
| Neutral alcohol | ml/1000 ml | 119 | 119 | 119 | 119 | 119 | 119 | 119 | 119 | 119 |
| Citric acid anhydrous | g/1000 ml | 0.0165 | 0.165 | 0.825 | 1.65 | 3.3 | 4.95 | 6.6 | 8.25 | 8.25 |
| Sodium citrate | g/1000 ml | 4.26 | 4.26 | 4.26 | 4.26 | 4.26 | 4.26 | 4.26 | 4.26 | 4.26 |
| Rebaudioside M | g/1000 ml | 0.001 | 0.01 | 0.05 | 0.1 | 0.2 | 0.3 | 0.4 | 0.5 | 0.66 |
| Alcohol | v/v % | 7 | 7 | 7 | 7 | 7 | 7 | 7 | 7 | 7 |
| Amount of sodium | mg/100 ml | 100 | 100 | 100 | 100 | 100 | 100 | 100 | 100 | 100 |
| Sweetness intensity | — | 0.03 | 0.3 | 1.5 | 3 | 6 | 9 | 12 | 15 | 20 |
| Acidity | w/v % | 0.0015 | 0.015 | 0.075 | 0.15 | 0.3 | 0.45 | 0.6 | 0.75 | 0.75 |
| Sweetness intensity/acidity | — | 20 | 20 | 20 | 20 | 20 | 20 | 20 | 20 | 20 |
| Energy | kcal/100 ml | 40 | 40 | 41 | 41 | 42 | 42 | 43 | 43 | 44 |
| Reduction of alcohol's distinctive pungency | — | 2.5 | 3.1 | 3.7 | 4.2 | 4.6 | 4.9 | 4.9 | 5.0 | 5.0 |
| Natural sweetness | — | 2.4 | 2.9 | 4.0 | 4.4 | 4.7 | 4.7 | 4.4 | 4.4 | 4.4 |
| Quality in aftertaste | — | 2.6 | 3.2 | 4.0 | 4.3 | 4.5 | 4.5 | 4.3 | 4.3 | 4.3 |
| Overall evaluation | — | 2.4 | 3.0 | 4.0 | 4.2 | 4.5 | 4.7 | 4.3 | 4.4 | 4.4 |

TABLE 15

| Sample No. | Unit | TA1-A | TA1-B | TA1-C | TA1-D | TA1-E |
|---|---|---|---|---|---|---|
| Neutral alcohol | ml/1000 ml | 119 | 119 | 119 | 119 | 119 |
| Citric acid anhydrous | g/1000 ml | 10.3 | 0 | 0 | 0 | 0 |
| Malic acid | g/1000 ml | 0 | 10.7 | 0 | 0 | 0 |
| Lactic acid | g/1000 ml | 0 | 0 | 29 | 0 | 0 |
| Phosphoric acid | g/1000 ml | 0 | 0 | 0 | 7.8 | 0 |
| Tartaric acid | g/1000 ml | 0 | 0 | 0 | 0 | 11.8 |
| Sodium citrate | g/1000 ml | 4.26 | 4.26 | 4.26 | 4.26 | 4.26 |
| Rebaudioside D | g/1000 ml | 0.2 | 0.2 | 0.2 | 0.2 | 0.2 |
| Alcohol | v/v % | 7 | 7 | 7 | 7 | 7 |
| Amount of sodium | mg/100 ml | 100 | 100 | 100 | 100 | 100 |
| Sweetness intensity | — | 6 | 6 | 6 | 6 | 6 |
| Acidity | w/v % | 1 | 1 | 1 | 1 | 1 |
| Sweetness intensity/acidity | — | 6 | 6 | 6 | 6 | 6 |
| Energy | kcal/100 ml | 44 | 45 | 45 | 44 | 45 |
| Reduction of alcohol's distinctive pungency | — | 4.7 | 4.6 | 4.7 | 4.7 | 4.7 |
| Natural sweetness | — | 4.3 | 4.3 | 4.3 | 4.3 | 4.3 |
| Quality in aftertaste | — | 4.3 | 4.2 | 4.3 | 4.2 | 4.3 |
| Overall evaluation | — | 4.5 | 4.5 | 4.5 | 4.5 | 4.5 |

[Example 9] Evaluation of Effect on Flavor of Alcoholic Beverage Containing Low-Intensity Sweetener As in Example 1, neutral alcohol, a sweetener, an acidic flavor substance, water and carbon dioxide were mixed in blending amounts as shown in Table 16, and a can container was filled with the mixture to prepare a sample liquid. The raw materials used are as follows: rebaudioside D: purity 90% or more, citric acid anhydrous: "Citric Acid anhydrous" from Jungbunzlauer AG, trisodium citrate: "Purified Sodium Citrate" from Fuso Chemical Co., Ltd., sugar (sucrose): "Granulated Sugar GS" from Mitsui Sugar Co., Ltd., and high-fructose corn syrup: "High Fructoca" from Kato Kagaku Co., Ltd. After the raw materials for each sample were blended, carbon dioxide gas was injected to a gas pressure of about 1.7 kgf/cm$^2$ at a liquid temperature of 20° C.

For "reduction of alcohol's distinctive pungency," "natural sweetness," "quality in aftertaste" and "overall evaluation," three trained specialist panelists evaluated each of the thus-prepared samples in accordance with the same criteria as in Example 1. The sodium content in the beverage was calculated from the amount of sodium citrate added, and the energy (kcal/100 ml) was calculated with RebD and the sodium-derived compound considered to have an energy of 0 (kcal/100 ml). Table 16 shows the results.

TABLE 16

| Sample No. | Unit | Y-30 | Y-30-1 | Y-30-2 | Y-30-3 | Y-30-4 | Y-30-5 | Y-30-6 | Y-30-7 | Y-30-8 |
|---|---|---|---|---|---|---|---|---|---|---|
| Neutral alcohol | ml/1000 ml | 119 | 119 | 119 | 119 | 119 | 119 | 339 | 339 | 339 |
| Citric acid anhydrous | g/1000 ml | 3.3 | 3.3 | 3.3 | 3.3 | 3.3 | 3.3 | 9.9 | 9.9 | 9.9 |
| Sodium citrate | g/1000 ml | 1.29 | 1.29 | 1.29 | 1.29 | 1.29 | 1.29 | 3.87 | 3.87 | 3.87 |
| Rebaudioside D | g/1000 ml | 0.2 | 0.18 | 0.18 | 0.5 | 0.45 | 0.45 | 1.5 | 1.35 | 1.35 |
| High-fructose corn syrup | g/1000 ml | 0 | 8 | 0 | 0 | 20 | 0 | 0 | 60 | 0 |
| Sugar | g/1000 ml | 0 | 0 | 6 | 0 | 0 | 15 | 0 | 0 | 45 |
| Alcohol | v/v % | 7 | 7 | 7 | 7 | 7 | 7 | 20 | 20 | 20 |
| Amount of sodium | mg/100 ml | 30 | 30 | 30 | 30 | 30 | 30 | 90 | 90 | 90 |
| Sweetness intensity | — | 6 | 6 | 6 | 15 | 15 | 15 | 45 | 45 | 45 |
| Acidity | w/v % | 0.3 | 0.3 | 0.3 | 0.3 | 0.3 | 0.3 | 3 | 3 | 3 |
| Sweetness intensity/acidity | — | 20 | 20 | 20 | 50 | 50 | 50 | 15 | 15 | 15 |
| Energy | kcal/100 ml | 41 | 43 | 43 | 41 | 47 | 47 | 117 | 135 | 135 |
| Reduction of alcohol's distinctive pungency | — | 4.9 | 4.9 | 4.9 | 4.9 | 5.0 | 5.0 | 4.3 | 4.3 | 4.3 |
| Natural sweetness | — | 4.4 | 4.6 | 4.6 | 4.4 | 4.6 | 4.7 | 3.8 | 3.9 | 3.9 |
| Quality in aftertaste | — | 4.4 | 4.5 | 4.5 | 4.4 | 4.5 | 4.5 | 3.7 | 3.9 | 3.9 |
| Overall evaluation | — | 4.9 | 4.9 | 4.9 | 4.9 | 5.0 | 5.0 | 4.0 | 4.1 | 4.1 |

[Example 10] Evaluation of Effect on Flavor of Alcoholic Beverage Containing Various Optional Other Sweeteners As in Example 1, neutral alcohol, a sweetener, an acidic flavor substance, water and carbon dioxide were mixed in blending amounts as shown in Table 17, and a can container was filled with the mixture to prepare a sample liquid. The thus-prepared samples in accordance with the same criteria as in Example 1. The sodium content in the beverage was calculated from the amount of sodium citrate added, and the energy (kcal/100 ml) was calculated with RebD, acesulfame K, sucralose and the sodium-derived compound considered to have an energy of 0 (kcal/100 ml). Table 17 shows the results.

TABLE 17

| Sample No. | Unit | Y-30-9 | Y-30-10 | Y-30-11 | Y-30-12 | Y-30-13 | Y-30-14 | Y-30-15 |
|---|---|---|---|---|---|---|---|---|
| Neutral alcohol | ml/1000 ml | 119 | 119 | 119 | 119 | 119 | 119 | 119 |
| Citric acid anhydrous | g/1000 ml | 3.3 | 3.3 | 3.3 | 3.3 | 3.3 | 3.3 | 3.3 |
| Sodium citrate | g/1000 ml | 1.29 | 1.29 | 1.29 | 1.29 | 1.29 | 1.29 | 1.29 |
| Rebaudioside D | g/1000 ml | 0.18 | 0.1 | 0.1 | 0.1 | 0.06 | 0.06 | 0.06 |
| High-fructose corn syrup | g/1000 ml | 0 | 40 | 0 | 0 | 56 | 0 | 0 |
| Sugar | g/1000 ml | 0 | 0 | 30 | 0 | 0 | 42 | 0 |
| Acesulfame K | g/1000 ml | 0.015 | 0 | 0 | 0.075 | 0 | 0 | 0.105 |
| Sucralose | g/1000 ml | 0.005 | 0 | 0 | 0.025 | 0 | 0 | 0.035 |
| Alcohol | v/v % | 7 | 7 | 7 | 7 | 7 | 7 | 7 |
| Amount of sodium | mg/100 ml | 30 | 30 | 30 | 30 | 30 | 30 | 30 |
| Sweetness intensity | — | 6 | 6 | 6 | 6 | 6 | 6 | 6 |
| Acidity | w/v % | 0.3 | 0.3 | 0.3 | 0.3 | 0.3 | 0.3 | 0.3 |
| Sweetness intensity/acidity | — | 20 | 20 | 20 | 20 | 20 | 20 | 20 |
| Ratio of sweetness intensity of rebaudioside D to total sweetness intensity | % | 90 | 50 | 50 | 50 | 30 | 30 | 30 |
| Energy | kcal/100 ml | 41 | 53 | 53 | 41 | 58 | 58 | 41 |
| Reduction of alcohol's distinctive pungency | — | 4.7 | 4.7 | 4.8 | 4.7 | 4.7 | 4.7 | 4.6 |
| Natural sweetness | — | 4.4 | 4.6 | 4.7 | 4.2 | 4.5 | 4.6 | 4.1 |
| Quality in aftertaste | — | 4.3 | 4.6 | 4.7 | 4.0 | 4.4 | 4.5 | 3.9 |
| Overall evaluation | — | 4.5 | 4.8 | 4.9 | 4.3 | 4.6 | 4.6 | 4.1 |

| Sample No. | Y-30-16 | Y-30-17 | Y-30-18 | Y-30-19 | Y-30-20 | Y-30-21 | Y-30-22 |
|---|---|---|---|---|---|---|---|
| Neutral alcohol | 119 | 119 | 119 | 119 | 119 | 119 | 119 |
| Citric acid anhydrous | 3.3 | 3.3 | 3.3 | 3.3 | 3.3 | 3.3 | 3.3 |
| Sodium citrate | 1.29 | 1.29 | 1.29 | 1.29 | 1.29 | 1.29 | 1.29 |
| Rebaudioside D | 0.45 | 0.25 | 0.25 | 0.25 | 0.15 | 0.15 | 0.15 |
| High-fructose corn syrup | 0 | 100 | 0 | 0 | 140 | 0 | 0 |
| Sugar | 0 | 0 | 75 | 0 | 0 | 105 | 0 |
| Acesulfame K | 0.0375 | 0 | 0 | 0.1875 | 0 | 0 | 0.2625 |
| Sucralose | 0.0125 | 0 | 0 | 0.0625 | 0 | 0 | 0.0875 |
| Alcohol | 7 | 7 | 7 | 7 | 7 | 7 | 7 |
| Amount of sodium | 30 | 30 | 30 | 30 | 30 | 30 | 30 |
| Sweetness intensity | 15 | 15 | 15 | 15 | 15 | 15 | 15 |
| Acidity | 0.3 | 0.3 | 0.3 | 0.3 | 0.3 | 0.3 | 0.3 |
| Sweetness intensity/acidity | 50 | 50 | 50 | 50 | 50 | 50 | 50 |
| Ratio of sweetness intensity of rebaudioside D to total sweetness intensity | 90 | 50 | 50 | 50 | 30 | 30 | 30 |
| Energy | 41 | 71 | 71 | 41 | 83 | 83 | 41 |
| Reduction of alcohol's distinctive pungency | 5.0 | 4.8 | 5.0 | 4.9 | 4.7 | 4.7 | 4.7 |
| Natural sweetness | 4.3 | 4.4 | 4.5 | 4.1 | 4.5 | 4.4 | 4.0 |
| Quality in aftertaste | 4.1 | 4.3 | 4.4 | 3.9 | 4.4 | 4.3 | 3.9 |
| Overall evaluation | 4.7 | 4.6 | 4.7 | 4.4 | 4.5 | 4.5 | 4.3 | raw materials used are as follows: rebaudioside D: purity 90% or more, citric acid anhydrous: "Citric Acid anhydrous" from Jungbunzlauer AG, trisodium citrate: "Purified Sodium Citrate" from Fuso Chemical Co., Ltd., sugar (sucrose): "Granulated Sugar GS" from Mitsui Sugar Co., Ltd., high-fructose corn syrup: "High Fructoca" from Kato Kagaku Co., Ltd., Acesulfame K: "sunett" from Celanese Production Germany GmbH & Co. KG, and sucralose: "Sucralose" from Tate & Lyle Japan KK. After the raw materials for each sample were blended, carbon dioxide gas was injected to a gas pressure of about 1.7 kgf/cm$^2$ at a liquid temperature of 20° C.

For "reduction of alcohol's distinctive pungency," "natural sweetness," "quality in aftertaste" and "overall evaluation," three trained specialist panelists evaluated each of the

The invention claimed is:

1. An alcoholic beverage comprising one or more steviol glycosides selected from rebaudioside D and rebaudioside M, wherein
    a content of the steviol glycosides is 0.04 to 0.5 g/1000 ml,
    an alcohol content is 3.0 to 40.0 v/v %, and
    the effect of one or both of rebaudioside D and rebaudioside M on reducing alcohol's distinctive pungency is perceptible.

2. The alcoholic beverage according to claim 1, wherein a sweetness intensity is 0.1 to 20, and wherein the sweetness intensity is assessed relative to a 1° Brix solution of sucrose, which is defined as having a sweetness intensity of 1.

3. The alcoholic beverage according to claim 1, further comprising an acidic flavor substance,
   wherein an acidity is 0.01 to 5.0 w/v %.

4. The alcoholic beverage according to claim 1, wherein a sweetness intensity/acidity is 1 to 700, and wherein the sweetness intensity is assessed relative to a 1° Brix solution of sucrose, which is defined as having a sweetness intensity of 1.

5. The alcoholic beverage according to claim 1, further comprising sodium at 5 to 200 mg/100 ml, and/or potassium at 5 to 300 mg/100 ml.

6. The alcoholic beverage according to claim 1, further comprising a low-intensity sweetener.

7. The alcoholic beverage according to claim 6, wherein the low-intensity sweetener comprises a sweetener selected from glucose, sucrose, fructose, maltose, oligosaccharide, lactose, psicose, allose, tagatose, xylose, ribose, high-fructose corn syrup and a combination thereof.

8. The alcoholic beverage according to claim 1, wherein the alcoholic beverage has an energy of not more than 100 Kcal/100 ml.

9. The alcoholic beverage according to claim 5, wherein the sodium is in at least one form selected from the group consisting of sodium chloride, sodium hydroxide, sodium malate, sodium sulfate, sodium citrate, sodium phosphate, sodium carbonate, sodium disulfide, sodium bicarbonate, sodium alginate, sodium arginate, sodium glucoheptanoate, sodium gluconate, sodium glutamate, sodium tartrate, sodium aspartate, sodium lactate, casein sodium, sodium ascorbate and a mixture thereof.

10. The alcoholic beverage according to claim 5, wherein the potassium is in at least one form selected from the group consisting of potassium alginate, potassium chloride, potassium citrate, potassium gluconate, potassium L-glutamate, potassium bromate, potassium hydrogen DL-tartrate, potassium hydrogen L-tartrate, potassium nitrate, potassium hydroxide, potassium sorbate, potassium carbonate, potassium lactate, norbixin potassium, potassium pyrosulfite, tetrapotassium pyrophosphate, potassium ferrocyanide, potassium polyphosphate, potassium metaphosphate, aluminum potassium sulfate, potassium sulfate, tripotassium phosphate, dipotassium hydrogen phosphate, potassium dihydrogen phosphate and a mixture thereof.

11. The alcoholic beverage according to claim 1, wherein the alcoholic beverage is a beverage flavored with a citrus, a pomaceous fruit, a stone fruit, a berry fruit, a nut, a tropical or semitropical fruit, a fruity vegetable, a root vegetable, a leaf or stem vegetable, a fruit vegetable, a savory herb and garnish, an energy drink, coffee, a tea, cocoa, cola, a dessert or a milky beverage.

12. The alcoholic beverage according to claim 1, which is a sparkling beverage.

13. The alcoholic beverage according to claim 1, further comprising a high-intensity sweetener other than rebaudioside D and rebaudioside M.

14. A 1.2 to 10 times concentrated product for providing the alcoholic beverage according to claim 1.

15. A method for reducing alcohol's distinctive pungency of an alcoholic beverage having an alcohol content of 3.0 to 40.0 v/v %, comprising adding one or more steviol glycosides selected from rebaudioside D and rebaudioside M to an alcoholic beverage at 0.04 to 0.5 g/1000 ml, wherein
   the effect of one or both of rebaudioside D and rebaudioside M on reducing the alcohol's distinctive pungency is perceptible.

16. The alcoholic beverage according to claim 1, wherein the alcohol content is 3.0 to 20.0 v/v %.

17. The alcoholic beverage according to claim 1, wherein the alcohol content is 18.0 to 40.0 v/v %.

18. An alcoholic beverage comprising one or more steviol glycosides selected from rebaudioside D and rebaudioside M, wherein
   a content of the steviol glycosides is 0.04 to 0.5 g/1000 ml,
   an alcohol content is 3.0 to 20.0 v/v %,
   the effect of one or both of rebaudioside D and rebaudioside M on reducing the alcohol's distinctive pungency is perceptible,
   the alcoholic beverage comprises one or more other steviol glycosides, and
   the composition ratio, in terms of mass ratio, of the total amount of rebaudioside D and rebaudioside M to the total amount of the other steviol glycosides is 99:1 to 60:40.

* * * * *